United States Patent
Bahl et al.

(10) Patent No.: US 7,590,658 B2
(45) Date of Patent: Sep. 15, 2009

(54) SYSTEM, SOFTWARE AND METHOD FOR EXAMINING A DATABASE IN A FORENSIC ACCOUNTING ENVIRONMENT

(75) Inventors: Yogesh Bahl, Port Chester, NY (US); Bruce Gavioli, Little Silver, NJ (US); Joseph Looby, Montclair, NJ (US)

(73) Assignee: Deloitte Development LLC, Hermitage, TN (US)

( * ) Notice: Subject to any disclaimer, the term of this patent is extended or adjusted under 35 U.S.C. 154(b) by 366 days.

(21) Appl. No.: 11/226,906

(22) Filed: Sep. 13, 2005

(65) Prior Publication Data

US 2006/0173812 A1 Aug. 3, 2006

Related U.S. Application Data

(60) Provisional application No. 60/614,769, filed on Sep. 30, 2004.

(51) Int. Cl.
*G06F 17/30* (2006.01)
(52) U.S. Cl. .................. 707/104.1; 707/200
(58) Field of Classification Search .......... 707/1, 707/100, 104.1, 200; 705/31
See application file for complete search history.

(56) References Cited

U.S. PATENT DOCUMENTS

| | | | |
|---|---|---|---|
| 5,832,495 A | 11/1998 | Gustman | |
| 5,956,711 A | 9/1999 | Sullivan et al. | |
| 6,154,766 A | 11/2000 | Yost et al. | |
| 6,691,098 B1 | 2/2004 | Agrawal et al. | |
| 2002/0099563 A1 | 7/2002 | Adendorff et al. | |
| 2004/0088233 A1* | 5/2004 | Brady et al. | 705/31 |
| 2004/0205008 A1* | 10/2004 | Haynie et al. | 705/31 |
| 2005/0222928 A1 | 10/2005 | Steier et al. | |
| 2005/0222929 A1 | 10/2005 | Steier et al. | |

FOREIGN PATENT DOCUMENTS

| | | |
|---|---|---|
| EP | 0 638 870 | 2/1995 |
| EP | 0 986 010 | 3/2000 |
| WO | WO 02/27528 | 4/2002 |

OTHER PUBLICATIONS

Bose et al.; Application of Intelligent Agent Technology for Managerial Data Analysis and Mining; The DATA BASE for Advances in Information Systems—Winter 1999 (vol. 30, No. 1).
Rygielski et al.; Data Mining Techniques for Customer Relationship Management; Technology in Society, vol. 24, 2002.
Goil et al.; Parsimony: An Infrastructure for Parallel Multidimensional Analysis and Data Mining; Journal of Parallel and Distributed Computing, vol. 61, 2001.
Nils Rasmussen et al., Financial Business Intelligence, Trends, Technology, Software Selection, and Implementation, John Wiley & Sons, Inc., 2002.

* cited by examiner

*Primary Examiner*—Cheryl Lewis
(74) *Attorney, Agent, or Firm*—Kramer Levin Naftalis & Frankel LLP

(57) ABSTRACT

A system, software and method which enable the forensic examination of a database, particularly, a financial database such as a general ledger. The system, software and method leverage "n-" or multi-dimensional data interrogation analytics, particularly, online analytical processing ("OLAP"), to enable real-time data analysis of various dimensions of multi-dimensional data in the database and identification of records that are unusual and/or significant including from patterns or relationships among the data.

22 Claims, 35 Drawing Sheets

DATA FORMAT - JOURNAL ENTRY DETAIL

EXAMPLE OF SELECT JOURNAL ENTRY DETAIL FIELDS TO BE OBTAINED:

| ID | JOURNAL_TYPE | JOURNAL_TYPE_DESC | SOURCE | SOURCE_DESC | AMOUNT | AMOUNT_INDICATOR | EXPLANATION | ACCOUNT_NUMBER | ACCOUNT_NAME | ACCOUNT_GROUP | MAJOR_CODE | BUSINESS_UNIT | BUSINESS_UNIT_NAME |
|---|---|---|---|---|---|---|---|---|---|---|---|---|---|
| 1001 | JNL | JOURNAL | AR | AR SUBSYSTEM | 200.00 | DR | SALE #12345 | 102-100 | AR GENERAL | AR | 102 | 002 | WHOLESALE |
| 1001 | JNL | JOURNAL | AR | AR SUBSYSTEM | 100.00 | CR | SALE #12345 | 301-100 | SALES-PRODUCT A | SALES | 301 | 002 | WHOLESALE |
| 1001 | JNL | JOURNAL | AR | AR SUBSYSTEM | 100.00 | CR | SALE #12345 | 301-200 | SALES-PRODUCT B | SALES | 301 | 002 | WHOLESALE |
| 1002 | RCL | RECLASS | AR | MANUAL JE | 150.00 | DR | CAPITALIZE EXP | 103-100 | PLANT | PP&E | 103 | 020 | CORPORATE |
| 1002 | RCL | RECLASS | AR | MANUAL JE | 150.00 | CR | CAPITALIZE EXP | 201-100 | SUPPLIES EXPENSE | OTHER EXPENSE | 201 | 020 | CORPORATE |

| DEPT | DEPT_NAME | USER | USER_NAME | POSTING_PERIOD | POSTING_YEAR | POSTING_DATE | CREATE_DATE |
|---|---|---|---|---|---|---|---|
| A1 | LA FACILITY | NYC343 | COL. KURTZ | 11 | 2003 | 11/2/2003 | 10/31/2003 |
| A1 | LA FACILITY | NYC343 | COL. KURTZ | 11 | 2003 | 11/2/2003 | 10/31/2003 |
| A1 | LA FACILITY | NYC343 | COL. KURTZ | 11 | 2003 | 11/2/2003 | 10/31/2003 |
| C13 | CONTROLLERS OFFICE | ASC123 | KEYSER SOZE | 1 | 2003 | 1/31/2003 | 1/5/2004 |
| C13 | CONTROLLERS OFFICE | ASC123 | KEYSER SOZE | 1 | 2003 | 1/31/2003 | 1/5/2004 |

FIG. 3a

CHART OF ACCOUNTS

| ACCOUNT NUMBER | ACCOUNT DESC | ACCOUNT TYPE | ACCOUNT GROUP |
|---|---|---|---|
| 010_1000 | CASH | BALANCE SHEET | |
| 010_2000 | BANK-SALES DEPOSIT | BALANCE SHEET | |
| 040_5001 | INVESTMENTS | BALANCE SHEET | |
| 200_1000 | ACCOUNTS PAYABLE | BALANCE SHEET | |
| 200_2400 | UNCLAIMED WAGES | BALANCE SHEET | |
| 250_2500 | ACCRUED EXPENSES | BALANCE SHEET | |
| 300_1000 | RETAIL SALES | INCOME STATEMENT | SALES |
| 300_2000 | ONLINE SALES | INCOME STATEMENT | SALES |
| 350_3000 | PROMOTION ALLOW. | INCOME STATEMENT | COST OF SALES |
| 360_4000 | INVENTORY ADJ. | INCOME STATEMENT | COST OF SALES |
| 400_1000 | SALARIES | INCOME STATEMENT | LABOR |
| 620_1500 | MISC. TAXES | INCOME STATEMENT | TAXES |
| 660_2000 | DEPRECIATION - PLANT | INCOME STATEMENT | DEPRECIATION |
| 800_4000 | INTEREST ON BORROW | INCOME STATEMENT | INTEREST |
| 950_1000 | OTHER - FINES | INCOME STATEMENT | OTHER INCOME/EXPENSES |

FIG. 3b

TRIAL BALANCE

| ACCOUNT NUMBER | ACCOUNT NAME | ACCOUNT BALANCE |
|---|---|---|
| 101-200 | PETTY CASH | $100.00 |
| 101-300 | CASH - BANK OF THE WORLD | $9,834.00 |
| 101-400 | CASH - BANK OF THE CITY | $20,393.00 |
| 102-500 | ACCOUNTS RECEIVABLE | $82,014.00 |
| 103-200 | PROPERTY | $3,240,904.00 |
| 103-400 | BUILDING | $321,093.00 |
| 104-300 | PREPAID EXPENSES | $324.00 |
| 204-400 | ACCOUNTS PAYABLE | ($53,432.00) |
| 205-200 | SHORT TERM DEBT | ($5,000.00) |
| 205-300 | LONG TERM DEBT | ($324,284,028.00) |

FIG. 3c

ATTRIBUTE PROFILE

◇ ENDING DIGITS

| NAME | TYPE* | ENDING DIGITS INDICATOR | DEBIT CREDIT INDICATOR | CREATE YEAR/QUARTER 2002 1 | CREATE YEAR/QUARTER 2002 2 | CREATE YEAR/QUARTER 2002 3 | CREATE YEAR/QUARTER 2002 4 | CREATE YEAR/QUARTER 2003 1 | Total |
|---|---|---|---|---|---|---|---|---|---|
| 1 SALES | RECLASS JE | ENDING DIGITS | DEBIT | $ - | $ 44,970.00 | $ 27,511.00 | $ 138,312.00 | $ 219,500.00 | $ 430,393.00 |
| 1 SALES | RECLASS JE | ENDING DIGITS | CREDIT | $ (26,531.00) | $ (58,270.00) | $ (18,944.00) | $ (129,200.00) | $ (219,600.00) | $ (452,545.00) |

— RECLASS JE ENDING DIGITS DEBIT
— RECLASS JE ENDING DIGITS CREDIT

| NAME | TYPE* | ENDING DIGITS INDICATOR | DEBIT CREDIT INDICATOR | CREATE YEAR/QUARTER 2002 1 | CREATE YEAR/QUARTER 2002 2 | CREATE YEAR/QUARTER 2002 3 | CREATE YEAR/QUARTER 2002 4 | CREATE YEAR/QUARTER 2003 1 | Total |
|---|---|---|---|---|---|---|---|---|---|
| 1 SALES | AJE | ENDING DIGITS | DEBIT | $ 20,993.00 | $ 7,017,410.00 | $ 38,266.00 | $ 39,560.00 | $ 296.00 | $ 7,116,125.00 |
| 1 SALES | AJE | ENDING DIGITS | CREDIT | $ (2,205.00) | $ (5,859,132.00) | $ (19,582.00) | $ (1,506,787.00) | $ (5,813.00) | $ (7,393,519.00) |

— AJE ENDING DIGITS DEBIT
— AJE ENDING DIGITS CREDIT

*RECLASS JE=AFFECTS ONLY INCOME STATEMENT
*ADJUSTING JE=AFFECTS BOTH INCOME AND BALANCE SHEET

ATTRIBUTE PROFILE
◇ Z-SCORE

| NAME | Z-SCORE | DEBIT/CREDIT INDICATOR | YEAR/QUARTER 2002 1 | YEAR/QUARTER 2002 2 | YEAR/QUARTER 2002 3 | YEAR/QUARTER 2002 4 | YEAR/QUARTER 2003 1 |
|---|---|---|---|---|---|---|---|
| 1 SALES | -19 | CREDIT | 0.00% | 13.98% | 0.00% | 0.00% | 0.00% |
| 1 SALES | -16 | CREDIT | 0.00% | 0.00% | 0.00% | 14.12% | 20.07% |
| 1 SALES | -15 | CREDIT | 0.00% | 10.97% | 0.00% | 27.53% | 18.56% |
| 1 SALES | -14 | CREDIT | 0.00% | 9.85% | 0.00% | 25.51% | 17.85% |
| 1 SALES | -13 | CREDIT | 18.11% | 36.42% | 47.25% | 57.33% | 16.57% |
| 1 SALES | -12 | CREDIT | 57.04% | 69.40% | 27.58% | 54.73% | 0.00% |
| 1 SALES | -11 | CREDIT | 10.63% | 7.86% | 66.75% | 0.00% | 14.15% |
| 1 SALES | -10 | CREDIT | 4.79% | 6.90% | 59.90% | 0.00% | 12.11% |
| 1 SALES | -9 | CREDIT | 8.52% | 19.37% | 0.00% | 24.64% | 0.00% |
| 1 SALES | -8 | CREDIT | 0.00% | 0.00% | 29.16% | 0.00% | 0.00% |
| 1 SALES | -7 | CREDIT | 0.00% | 4.94% | 0.00% | 0.00% | 0.00% |
| 1 SALES | -4 | CREDIT | 0.00% | 2.93% | 0.00% | 0.00% | 0.00% |
| 1 SALES | -3 | CREDIT | 0.00% | 3.93% | 0.00% | 0.00% | 3.79% |
| 1 SALES | -2 | CREDIT | 0.00% | 12.28% | 0.00% | 0.00% | 0.00% |
| 1 SALES | -1 | CREDIT | 1.18% | 14.96% | 2.45% | 1.83% | 0.77% |
| 1 SALES | 0 | CREDIT | 4.39% | 26.09% | 10.52% | 8.58% | 1.80% |
| 1 SALES | 0 | DEBIT | -3.67% | -40.34% | -75.33% | -71.49% | -0.54% |
| 1 SALES | 1 | DEBIT | -1.00% | -44.20% | -68.27% | -41.45% | -1.34% |
| 1 SALES | 2 | DEBIT | 0.00% | -18.55% | 0.00% | -1.34% | 0.00% |
| 1 SALES | 3 | DEBIT | 0.00% | -8.44% | 0.00% | 0.00% | -3.79% |
| 1 SALES | 4 | DEBIT | 0.00% | -2.93% | 0.00% | 0.00% | 0.00% |
| 1 SALES | 7 | DEBIT | 0.00% | -4.94% | 0.00% | 0.00% | 0.00% |
| 1 SALES | 9 | DEBIT | 0.00% | -6.50% | 0.00% | 0.00% | 0.00% |
| 1 SALES | 20 | DEBIT | 0.00% | -13.98% | 0.00% | 0.00% | 0.00% |

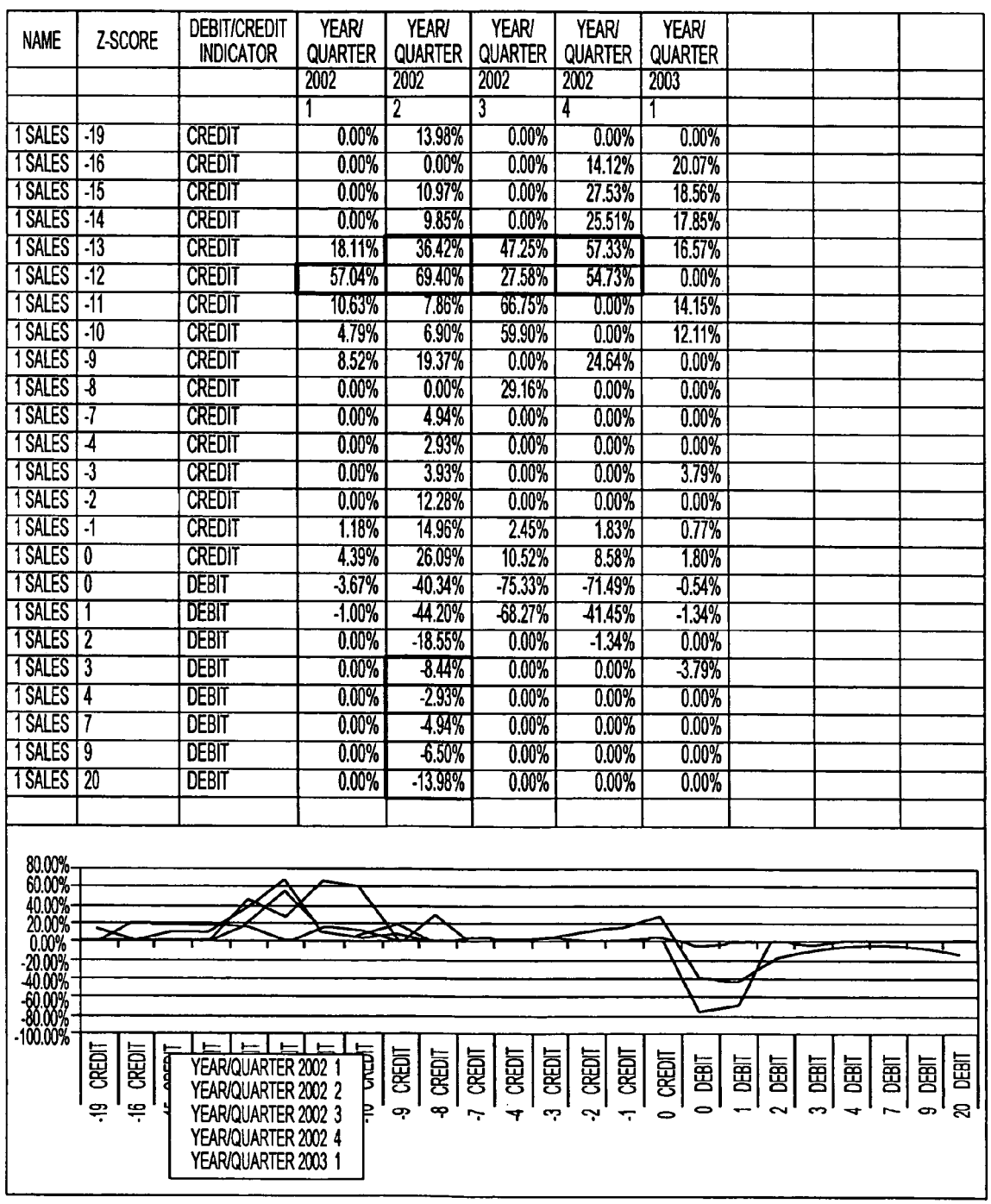

USER PROFILE

| | | | 2002 | | | | | 2003 |
|---|---|---|---|---|---|---|---|---|
| | | | Q1 | Q2 | Q3 | Q4 | Q4 15 DAYS TO YEAR END | Q1 AFTER YEAR END |
| 1 SALES | AJE | NU3307 | | -35.72% | | | | |
| | | NU3579 | 77.75% | 153.35% | 231.02% | 204.83% | | 99.43% |
| | | NU8122 | | | -19.19% | 0.42% | | 0.58% |
| | | NU9926 | | -10.17% | -52.76% | | | |
| | | NUEJM1 | | | | -37.03% | | |
| | | NUSS18 | | -5.99% | | | | |
| | | NUSS56 | 21.34% | | | | | |
| | | X1UCJI1 | 0.00% | | | | | |
| | | X1UDER1 | | | | | | |
| | | X1UKJM1 | 1.06% | -0.86% | 0.54% | -1.22% | 101.83% | -0.01% |
| | | X1UKSG2 | -0.01% | | | -0.01% | | |
| | | X1URSW1 | | | | | -1.83% | |
| | | X1URTW1 | 0.00% | | | | | |
| | | X1USMG1 | | -0.01% | | | | |
| | | X1USRJ1 | | | | -0.01% | | |
| | | X1UTCC1 | | | | -0.05% | | |
| | | X1TLB1 | -0.24% | | | -0.18% | | |
| | RECLASS IS | NU3307 | | -0.78% | | | | |
| | | NU8122 | | | -13.73% | -34.54% | | |
| | | NU9137 | | | | | | |
| | | NU9140 | | | | | | |
| | | NU9926 | | | -13.20% | | | |
| | | NUCCP1 | | | | | | |
| | | NUEJM1 | | | -30.64% | -32.19% | | |
| | | NUNJM1 | | | | | | |
| | | NUSS18 | | | | | | |
| | | X1UDER1 | | | | | | |
| | | X1UEER2 | | | | | | |
| | | X1UKJM1 | | | | -2.10% | | |
| | | X1UKSG2 | -0.15% | | 0.05% | | | |
| | | X1ULLF1 | | | | | | |
| | | X1ULWM1 | 0.23% | 0.18% | | | | |
| | | XUTCC1 | | | | -0.03% | | |
| | | X1UTMC1 | | | | | | |
| | | TOTAL | 100.00% | 100.00% | 100.00% | 100.00% | 100.00% | 100.00% |

*FIG. 4g*

USER PROFILE

USER BY +- 15 DAY

| NAME | TYPE | USER ID | 2002 | .2003 |
|---|---|---|---|---|
| | | | 4 | 1 |
| | | | 15 DAYS BEFORE YEAR END | AFTER YEAR END |
| 1 SALES | AJE | NU3307 | - | - |
| 1 SALES | AJE | NU3579 | - | (4,259,875.45) |
| 1 SALES | AJE | NU8122 | - | (24,887.19) |
| 1 SALES | AJE | NU9926 | - | - |
| 1 SALES | AJE | NUEJM1 | - | - |
| 1 SALES | AJE | NUSS18 | - | - |
| 1 SALES | AJE | NUSS56 | - | - |
| 1 SALES | AJE | X1UCJI1 | - | - |
| 1 SALES | AJE | X1UDER1 | - | - |
| 1 SALES | AJE | X1UKJM1 | (28,693.41) | 383.89 |
| 1 SALES | AJE | X1UKSG2 | - | - |
| 1 SALES | AJE | X1URSW1 | 514.71 | - |
| 1 SALES | AJE | X1URTW1 | - | - |
| 1 SALES | AJE | X1USMG1 | - | - |
| 1 SALES | AJE | X1USRJ1 | - | - |
| 1 SALES | AJE | X1UTCC1 | - | - |
| 1 SALES | AJE | X1TLB1 | - | - |
| 1 SALES | RECLASS IS | NU3307 | - | - |
| 1 SALES | RECLASS IS | NU8122 | - | - |
| 1 SALES | RECLASS IS | NU9137 | - | - |
| 1 SALES | RECLASS IS | NU9140 | - | - |
| 1 SALES | RECLASS IS | NU9926 | - | - |
| 1 SALES | RECLASS IS | NUCCP1 | - | - |
| 1 SALES | RECLASS IS | NUEJM1 | - | - |
| 1 SALES | RECLASS IS | NUNJM1 | - | - |
| 1 SALES | RECLASS IS | NUSS18 | - | - |
| 1 SALES | RECLASS IS | X1UDER1 | - | - |
| 1 SALES | RECLASS IS | X1UEER2 | - | - |
| 1 SALES | RECLASS IS | X1UKJM1 | - | - |
| 1 SALES | RECLASS IS | X1UKSG2 | - | - |
| 1 SALES | RECLASS IS | X1ULLF1 | - | - |
| 1 SALES | RECLASS IS | X1ULWM1 | - | - |
| 1 SALES | RECLASS IS | XUTCC1 | - | - |
| 1 SALES | RECLASS IS | X1UTMC1 | - | - |

FIG. 4h

USER PROFILE

◇ USER BY Z-SCORE

| NAME | TYPE* | Z-SCORE | DEBIT/CREDIT INDICATOR | USER ID | CREATE YEAR/ QUARTER | CREATE YEAR/ QUARTER | CREATE YEAR/ QUARTER | CREATE YEAR/ QUARTER | CREATE YEAR/ QUARTER |
|---|---|---|---|---|---|---|---|---|---|
| | | | | | 2002 | 2002 | 2002 | 2002 | 2003 |
| | | | | | 1 | 2 | 3 | 4 | 1 |
| 1 SALES | AJE | -19 | CREDIT | X1UKJM1 | - | (1,060,613.00) | - | - | - |
| 1 SALES | AJE | -16 | CREDIT | NU3579 | - | - | - | (856,780.99) | (859,792.47) |
| 1 SALES | AJE | -15 | CREDIT | NU3579 | - | (832,104.43) | - | (1,670,385.37) | (795,327.99) |
| 1 SALES | AJE | -14 | CREDIT | NU3579 | - | (7,46,911.73) | - | (1,547,769.43) | (764,797.19) |
| 1 SALES | AJE | -13 | CREDIT | NU3579 | (2,064,184.70) | (2,762,209.18) | (2,158,342.94) | (3,478,348.01) | (709,813.04) |
| 1 SALES | AJE | -12 | CREDIT | NU3579 | (4,552,944.28) | (5,263,484.71) | (1,259,698.15) | (3,320,411.61) | - |
| 1 SALES | AJE | -12 | CREDIT | NUSS56 | (1,949,462.14) | - | - | - | - |
| 1 SALES | AJE | -11 | CREDIT | NU3579 | (1,211,456.48) | (596,183.19) | (3,048,712.04) | - | (606,168.45) |
| 1 SALES | AJE | -10 | CREDIT | NU3579 | (546,476.84) | (523,564.19) | (2,735,948.29) | - | (518,976.31) |
| 1 SALES | AJE | -9 | CREDIT | NU3579 | (488,151.75) | (976,012.70) | - | (1,494,674.38) | - |
| 1 SALES | AJE | -9 | CREDIT | NUSS56 | (483,609.11) | - | - | - | - |
| 1 SALES | AJE | -9 | CREDIT | X1UKJM1 | - | (492,802.00) | - | - | - |
| 1 SALES | AJE | -8 | CREDIT | NU3579 | - | - | (1,332,052.71) | - | - |
| 1 SALES | AJE | -7 | CREDIT | X1UKJM1 | - | (374,338.00) | - | - | - |
| 1 SALES | AJE | -4 | CREDIT | X1UKJM1 | - | (222,010.00) | - | - | - |
| 1 SALES | AJE | -3 | CREDIT | X1UKJM1 | - | (297,916.00) | - | - | - |
| 1 SALES | AJE | 3 | DEBIT | NU3307 | - | 342,012.00 | - | - | - |
| 1 SALES | AJE | 3 | DEBIT | X1UKJM1 | - | 297,916.00 | - | - | - |
| 1 SALES | AJE | 4 | DEBIT | X1UKJM1 | - | 222,010.00 | - | - | - |
| 1 SALES | AJE | 7 | DEBIT | X1UKJM1 | - | 374,338.00 | - | - | - |
| 1 SALES | AJE | 9 | DEBIT | X1UKJM1 | - | 492,802.00 | - | - | - |
| 1 SALES | AJE | 20 | DEBIT | X1UKJM1 | - | 1,060,613.00 | - | - | - |
| 1 SALES | RECLASS IS | -3 | CREDIT | NUCCP1 | - | - | - | - | (162,190.00) |
| 1 SALES | RECLASS IS | 3 | DEBIT | NUCCP1 | - | - | - | - | 162,190.00 |

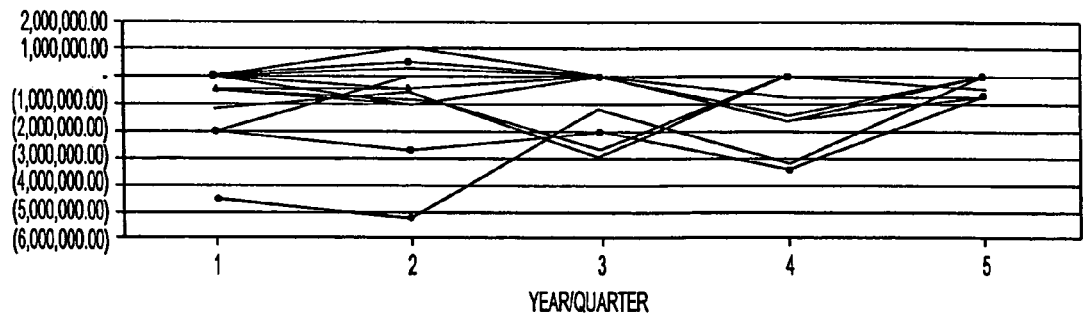

FIG. 4i

| JOURNAL_TYPE | MAJOR_CODE | JOURNAL_ID | JOURNAL_TYPE_DESC | SOURCE | SOURCE_DESC | AMOUNT |
|---|---|---|---|---|---|---|
| C/E | 300 | 10 503 1340 | Recurring Journals | | | 1625.28 |
| | | 10 503 1340 | Recurring Journals | | | 1973.55 |
| | | 10 503 1340 | Recurring Journals | | | 435.46 |
| | | 10 503 1340 | Recurring Journals | | | 1330.23 |
| | | 10 503 1340 | Recurring Journals | | | 643.22 |
| | | 10 503 1340 | Recurring Journals | | | 924.63 |
| | | 10 503 1340 | Recurring Journals | | | 1017.47 |
| | | 10 503 1340 | Recurring Journals | | | 1478.44 |
| | | 10 503 1340 | Recurring Journals | | | 912.02 |
| | | 10 503 1340 | Recurring Journals | | | 900.95 |
| | | 10 503 1340 | Recurring Journals | | | 1392.18 |
| | | 10 503 1340 | Recurring Journals | | | 2447.94 |
| | | 10 503 1340 | Recurring Journals | | | 2924.75 |
| | | 10 503 1340 | Recurring Journals | | | 1316.95 |
| | | 10 503 1340 | Recurring Journals | | | 475.23 |
| | | 10 503 1340 | Recurring Journals | | | 1059.34 |
| | | 10 503 1340 | Recurring Journals | | | 1077.25 |
| | | 10 503 1340 | Recurring Journals | | | 1122.39 |
| | | 10 503 1340 | Recurring Journals | | | 756.52 |
| | | 10 503 1340 | Recurring Journals | | | 1694.33 |
| | | 10 503 1340 | Recurring Journals | | | 1857.6 |
| | | 10 503 1340 | Recurring Journals | | | 3920.23 |
| | | 10 503 1340 | Recurring Journals | | | 836.17 |
| | | 10 503 1340 | Recurring Journals | | | 3151.04 |
| | | 10 503 1340 | Recurring Journals | | | 621.44 |
| | | 10 503 1340 | Recurring Journals | | | 748.25 |
| | | 10 503 1340 | Recurring Journals | | | 1252.63 |

Filter Criteria
- ● Field begins with the letter
- ○ Field contains the text
- ○ Field is the text Letter Set Filter
Run Filter Unset
Unset All
Exit JOURNAL_ID
JOURNAL_TYPE
JOURNAL_TYPE_DESC
SOURCE
SOURCE_DESC
AMOUNT
AMOUNT_INDICATOR Field Statistics Caption
Statistics

Record 1 of 12568

File  Edit  Report  Design  Print  Exit

| DT_IS_POPULATION ▷ | USER_ID ▷ | AMOUNT_INDICATOR ▷ | Year of CREATE_DATE ▷ | | | Qtr of CREATE_DATE ▷ | | | | | |
|---|---|---|---|---|---|---|---|---|---|---|---|
| | | | ⊞ 2002 | | | | ⊞ 2003 | | | | Total |
| | | | 1 | 2 | Total | 1 | 2 | 3 | 4 | Total | |
| ⊟ 1 SALES | ⊟ NU3307 | DEBIT | | 2768524.36 | 2768524.36 | | | | | | |
| | | Total | | 2768524.36 | 2768524.36 | | | | | | |
| | ⊟ NU3579 | CREDIT | -8863214.05 | 11700470.55 | | | | 10552251.13 | 12369640.60 | 4348576.33 | -4259875.45 | -42598 |
| | | DEBIT | | 69659.27 | | | | | | 69659.27 | |
| | | Total | -8863214.05 | 11630811.28 | | | | 10552251.13 | 12369640.60 | 4341591.06 | -4259875.45 | -42598 |
| | ⊟ NU8122 | CREDIT | | | | | | | -25359.27 | -25359.27 | -24887.19 | -248 |
| | | DEBIT | | | | | 1503412.53 | 2058668.39 | 3589080.92 | | |
| | | Total | | | | | 1503412.53 | 2060309.12 | 3563721.65 | -24887.19 | -248 |
| | ⊟ NU9137 | CREDIT | -26164.89 | -12364.18 | | | -6405.16 | | -18769.34 | | |
| | | DEBIT | 26164.89 | 12364.18 | | | 6405.16 | | 18769.34 | | |
| | | Total | 0.00 | 0.00 | | | 0.00 | | 0.00 | | |
| | ⊟ NU9140 | CREDIT | | | | | -12323.25 | | -3488.14 | | |
| | | DEBIT | | | | | 12323.25 | | 3488.14 | | |
| | | Total | | | | | 0.00 | | 0.00 | | |
| | ⊟ NU9926 | DEBIT | | 771165.83 | | | 3012700.36 | | 3783866.19 | | |
| | | Total | | 771165.83 | | | 3012700.36 | | 3783866.19 | | |
| | ⊟ NUCCP1 | CREDIT | | | | | | | | -219600.00 | -2196 |
| | | DEBIT | | | | | | | | 219600.00 | 2196 |
| | | Total | | | | | | | | 0.00 | |
| | ⊟ NUEJM1 | DEBIT | | | | | 1399313.95 | 4180383.25 | 5579677.20 | | |
| | | Total | | | | | 1399313.95 | 4180383.25 | 5579677.20 | | |
| | ⊟ NUNJM1 | CREDIT | | 44970.00 | | | -23863.00 | | -68833.00 | | |
| | | DEBIT | | 44970.00 | | | 23863.00 | | 68833.00 | | |
| | | Total | | 0.00 | | | 0.00 | | 0.00 | | |

FIG. 61

| | Year of POSTING_DATE ▽ | Qtr of POSTING_DATE ▽ | | | |
|---|---|---|---|---|---|
| | ⊟ 2002 | | | | Total |
| | 1 | 2 | 3 | 4 | |
| | | 276852436 | | | 276852436 |
| NU8122 | -8863214.05 | 11630811.28 | 10552251.13 | 12369640.60 | 43415917.06 |
| NU9140 | 0.00 | | | -25359.27 | -25359.27 |
| NUCCP1 | | | 0.00 | | 0.00 |
| NUEJM1 | | | | 160564.70 | 160564.70 |
| NUNJM1 | | 0.00 | | | 0.00 |
| NUSS56 | -2433071.25 | | | | -2433071.25 |
| X1UEER2 | | | | 0.00 | 0.00 |
| X1UKJM1 | | -17655.86 | | | -17655.86 |
| X1USMG1 | | 427.26 | | | 427.26 |
| XUTLB1 | 27104.66 | | | | 27104.66 |
| X1UTMC1 | | | 0.00 | | 0.00 |

FIG. 6n

| JOURNAL_TYPE ▷ | SOURCE_DESC ▷ | USER_ID ▷ | Year of POSTING_DATE ▷ | | Qtr of POSTING_DATE ▷ ☒1 ☒2 ☐3 ☐4 | AMOUNT_INDICATOR ▷ | |
|---|---|---|---|---|---|---|---|
| | | | =2002 | | | | |
| | | | =1 | | | DEBIT | Total |
| | | | CREDIT | DEBIT | | | |
| ☐ C/E | | NU3307 | | | | 276524.36 | 2768524.36 |
| | | NU3579 | -8863214.05 | | -8863214.05 | 69659.27 | 11630811.26 |
| | | NU8122 | | | | | |
| | | NU9140 | -26164.89 | 26164.89 | 0.00 | | |
| | | NUCCP1 | | | | 22485.00 | |
| | | NUNJM1 | | | -22485.00 | | 0.00 |
| | | NUSS56 | -2433071.25 | | -2433071.25 | | |
| | | X1UKJM1 | | 7584.72 | 27104.66 | 20442.15 | -17655.86 |
| | | X1USMG1 | | | | 427.26 | 427.26 |
| | | X1UTLB1 | -48580.06 | 101849.61 | 11269180.64 | 2881538.04 | -8879515.52 |
| | Total | | -11371030.25 | | -11761053.56 | | |
| ☐ JNL | | NU9137 | | | -12364.18 | 12364.18 | 0.00 |

| | | Year of POSTING_DATE ▽ | | | | | |
|---|---|---|---|---|---|---|---|
| | | | Qtr of POSTING_DATE ▽ | | | | |
| | | | | | ⊟ 2 | | |
| | | DEBIT | Total | CREDIT | DEBIT | Total | AMOUNT_INDICATOR ▽ |
| ⊟ C... | NU3579 | 0.36 | | 0.36 | | | |
| | NU8122 | | | | 0.47 | 1.00 | 1.0 |
| | NU9140 | | | | | 0.00 | 0.4 |
| | NUCCP1 | | | | | | |
| | NUNJM1 | 1.00 | | 1.00 | | | |
| | NUSS56 | | | | | | |
| | X1UKJM1 | | | | 2.16 | -1.16 | 1.0 |
| | X1USMG1 | -1.79 | 2.79 | 1.00 | | 1.00 | 1.0 |
| | X1UTLB1 | 0.47 | 0.00 | 0.46 | 0.48 | -0.12 | 0.3 |
| | Total | | | | | | |
| ⊟ JNL | NU9137 | -0.90 | 1.90 | 1.00 | -0.04 | 1.04 | 1.0 |
| | NU9926 | | | | | | |
| | NUNJM1 | | | | | | |
| | NUSS18 | | | | | | |
| | X1UCJI1 | | | | | | |

Record 1 of 12568

File | Edit | Report | Design | Print | Exit

SOUR... Refresh / Total / Data / Sizer / Filters / Performance Meter

% of Row
% of Column
None

FIG. 6s

Record 1 of 12568

File  Edit  Report  Design  Print  Exit

Setup
To Printer
To Excel

| SOURCE | ▽ | SOURCE_DESC | ▽ | | Year of POSTING_DATE | ▽ | Qtr of POSTING_DATE | ▽ | |
|---|---|---|---|---|---|---|---|---|---|
| | | | | | ⊟ 2002 | | | | |
| | | | | | 1 | | ⊟ 2 | | |
| JOURNAL_TYPE | ▽ | USER_ID | ▽ | EXPLANATIO ▽ | DEBIT | | DEBIT | Total | CREDIT |
| ⊟ C/E | | ⊟ NU3307 | | 4 SUSHI ADJ FOR | | | | | |
| | | | | 4 SUSHI SALES | | | | | |
| | | | | 4 TO BACKOUT | | | | | |
| | | | | 4 TO REVERSED | | | | | |
| | | | | Total | | | | | |
| | | ⊟ NU3579 | | 1 HOME SHOPPIN | | | 1.00 | 1.00 | 1.0 |
| | | | | 4 HOME SHOPPIN | | | | | |
| | | | | 4 PEAPOD SALE | 1.00 | | | | |
| | | | | 4 PERIOD 5 CLOS | 1.00 | | | 1.00 | 1.0 |
| | | | | 4 TO ADJ PREVIO | | | | | |
| | | | | 6 PEAPOD SALE | | | | | |

SYSTEM, SOFTWARE AND METHOD FOR EXAMINING A DATABASE IN A FORENSIC ACCOUNTING ENVIRONMENT

CROSS REFERENCE TO RELATED PROVISIONAL APPLICATION

This application claims the benefit of U.S. Provisional Patent Application No. 60/614,769 filed on Sep. 30, 2004, the disclosure of which is incorporated herein by reference in its entirety.

BACKGROUND OF THE INVENTION

The present invention is directed generally to a new system, software and method that enable the examination of a database, particularly, a financial database such as, for example, a general ledger, to identify records (transactions) that are anomalous or otherwise significant (e.g., as an indicator of fraudulent activity). More particularly, the system, software and method according to the present invention employ real-time "n-" or multi-dimensional data interrogation analytics, particularly, online analytical processing ("OLAP"), to enable real-time data interrogation in a forensic accounting application.

As is known to those of ordinary skill in the art, OLAP is a category of software tools that provides analysis of data stored in a database. OLAP tools enable users to analyze different dimensions of multi-dimensional data. OLAP provides distinct advantages over known data mining tools (a class of database applications that look for hidden patterns in a group of data)—including the capability to identify more than just mere relationships among data, but rather the capacity to identify aspects of the data that are anomalous. As described in greater detail hereinafter, the present invention (including through its use of statistical functions) provides a new forensic tool that leverages the advantages of OLAP.

There is an ongoing effort in the accounting/auditing field, particularly, in the forensic accounting field, to design procedures to test the appropriateness of records in large financial databases. The system, software and method according to the present invention are a new response to the needs of this effort.

Forensic accounting involves the integration of accounting, statistics, technology and investigative skills. Forensic accountants are typically retained to investigate, analyze and interpret financial evidence (e.g., in investigations of criminal matters such as employee theft, securities and insurance fraud), to assist in the analysis and presentation of financial evidence, and to communicate their findings (e.g., by testifying in court as expert witnesses and preparing visual aids to support trial evidence). Forensic accountants are also called upon to assist auditors in investigating potential fraudulent activity. Forensic accountants can be engaged in public practice or by insurance companies, banks, police forces, government agencies and other organizations.

Conventionally, forensic examiners use commercial database software such as, for example, ACL, MS Access and MS SQL Server, to review general ledger transaction entries. However, these commercial tools do not perform OLAP and require the user to program a query for each question posed or test with respect to the data. Moreover, these commercial tools report voluminous amounts of data that are unwieldy and unreasonable to review and are often not useful.

Accordingly, it is desired to provide a new system, software and method for use in forensic accounting investigations of financial databases that overcome the disadvantages associated with conventional software and methods and that enable, using OLAP, (i) an analysis of the same data sets, while breaking the data sets into different populations (e.g., income statement populations such as, for example, sales, cost of sales, labor, taxes, depreciation/amortization, interest and other income/expense), (ii) the identification of relationships between the populations and between the inquiries or tests with respect to the data, and (iii) the generation of results that are specific (useful) and that can translate into recommendations for the relevant users.

SUMMARY OF THE INVENTION

Generally speaking, the present invention is directed to a system, software and a method for effecting a forensic investigation of a database, especially a database containing financial information (e.g., a general ledger), using OLAP. The new system, software and method according to the present invention leverage known computer capabilities and electronic communications links to provide a new forensic accounting solution that enables the analysis of a financial database and the identification of risk areas, such as, for example, questionable transaction entries, indicative of material misstatements in an organization's financial records.

According to a preferred embodiment of the present invention, multi-dimensional data are stored in a database accessible to OLAP software having real-time data interrogation functionality. The software is adapted to analyze different dimensions of the data and to identify patterns and relationships among the data. The data are categorized into preselected categories. Templates defining data analysis attributes preselected to indicate significant and anomalous data are loaded into the software. Multi-dimensional data analysis is effected on the data in real-time based on the preselected template attributes and significant and anomalous data are pinpointed. Profiles comprising cubes (n-dimensional views of the database) and grids (two dimensional views of database records) are created and define maps to the database to facilitate navigation through the analyzed data. Navigation through the analyzed data is effected in "drill down" fashion (i.e., in the direction of decreasing dimensions of the data) based on the profiles. The result is an n-dimensional view of the underlying data including significant and anomalous data. A report of the significant and anomalous data is automatically generated, which can include actionable recommendations.

Accordingly, it is an object of the present invention to provide a new system, software and method that integrate accounting principles, statistics, technology and investigative techniques in a single forensic tool to enable forensic examination of a database of transactions to identify high-risk areas, such as questionable transaction entries, to detect material misstatements in an organization's financial records.

Still other objects and advantages of the present invention will in part be obvious and will in part be apparent from the specification.

The present invention accordingly comprises the various steps and the relation of one or more of such steps with respect to each of the others, and the system and software embody features which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description, taken in connection with the accompanying drawings, in which:

FIG. 2b is a flow diagram depicting process steps for effecting the step of pinpointing unusual significant records and cross-tabulating by attribute, user and/or source in accordance with the embodiment of the present invention shown in FIG. 2a;

FIGS. 3a-3c depict exemplary file and field guidelines for the financial database, chart of accounts and trial balance for forensic examination in accordance with the present invention;

FIGS. 4a-4i are exemplary computer screen outputs depicting various attributes analyzed using the new software which provides OLAP data interrogation functionality in accordance with a preferred embodiment of the present invention;

DETAILED DESCRIPTION OF THE PREFERRED EMBODIMENTS

In assessing the reliability of the numbers underlying an organization's financial records/reports/statements, forensic accountants invariably look first to the general ledger (GL). The GL is often a very large computer database containing financial transactions for all of an organization's operations. GLs can have many millions and even billions of transaction entries (transactions entered into the GL).

Forensic examiners analyze GLs to meet objectives of the type established in, for example, the Statement on Auditing Standards (SAS) No. 99 which generally requires the examination of data (e.g., transaction entries, adjustments and estimates) for evidence of possible material misstatement due to fraud. To achieve such objectives it is helpful to (a) know who is posting to transaction accounts and when, (b) know the posting sources (computer terminals with internal controls, or spreadsheets and external databases without controls), and (c) identify significant and unusual entries that merit closer examination.

The system, software and method according to the present invention provide a new forensic accounting solution. According to the present invention as discussed in greater detail hereinafter, leveraging OLAP, the entire GL can be explored in real-time for records and relationships among the data that are both unusual and significant.

Although discussed herein in the context of a financial database, the particular example being a GL, it should be understood that the present invention is not limited to the investigation of financial databases such as GLs, but has application with respect to other types of databases as well.

Figure 2A:
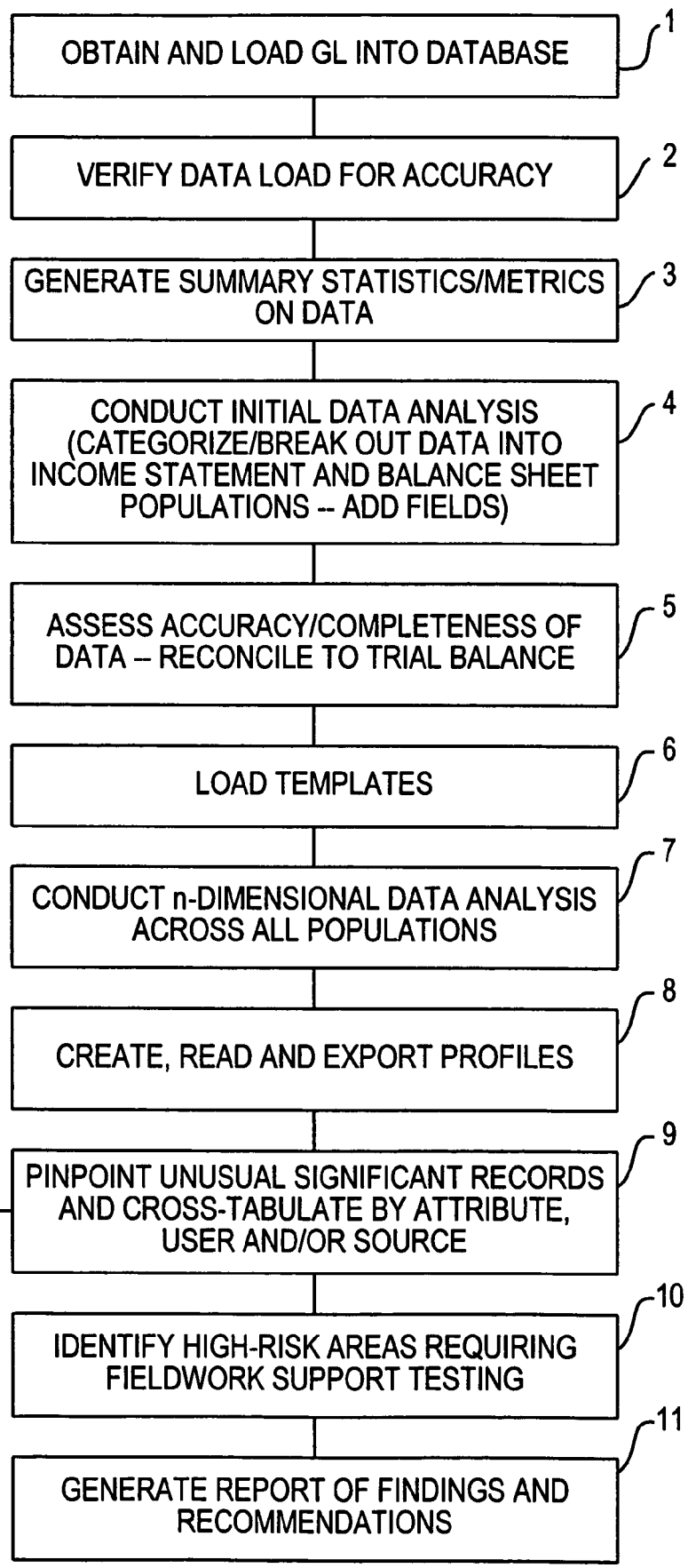
FIG. 2a is a high-level flow diagram depicting the process steps carried out in conducting a forensic examination of a financial database using the new software which provides OLAP data interrogation functionality in accordance with a preferred embodiment of the present invention.
Figure 2B:
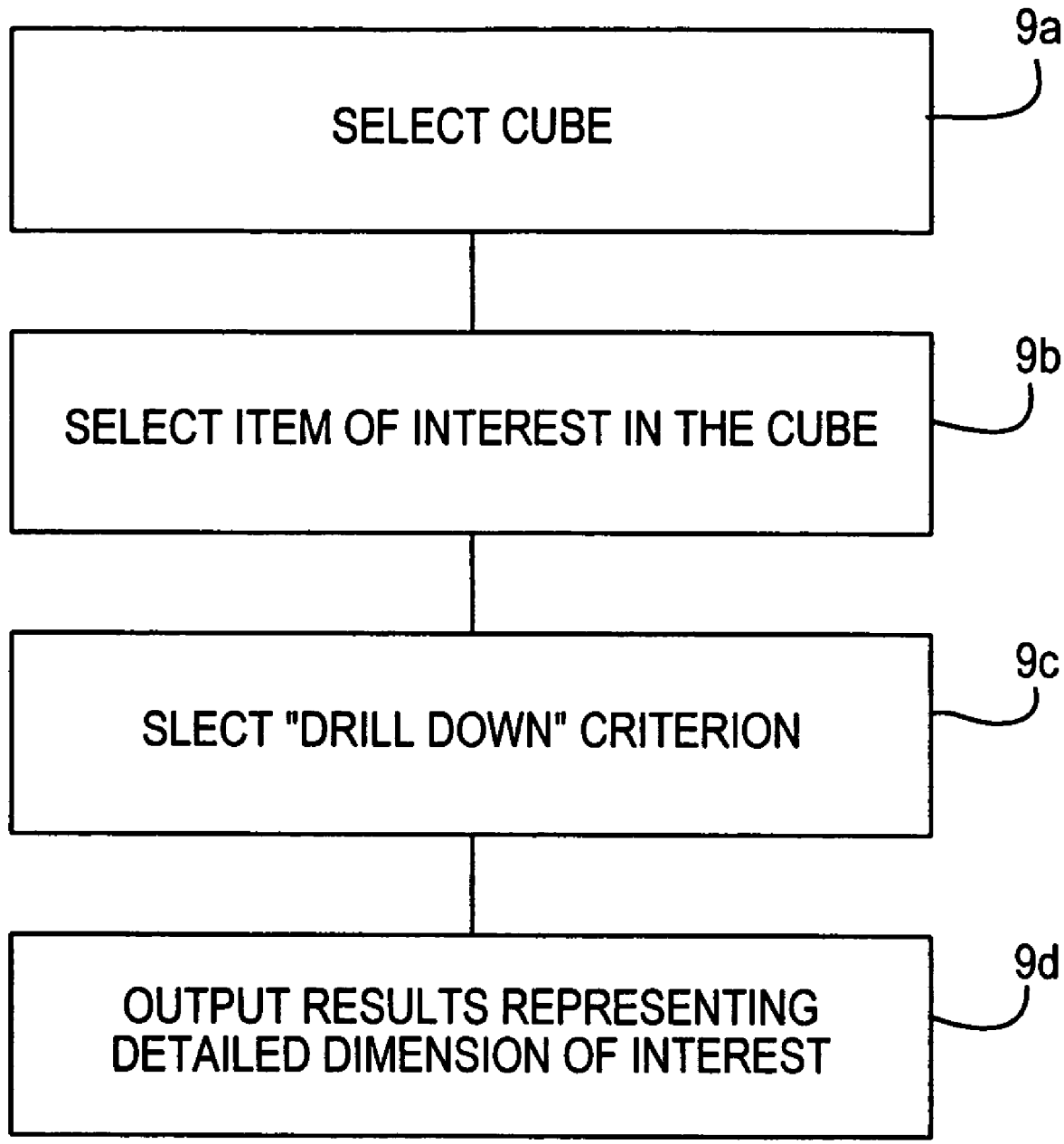

Referring now to the drawing figures, FIG. 2 depicts a high-level flow diagram of a preferred method in accordance with the present invention for conducting a forensic examination of a GL using software according to the present invention which provides OLAP data interrogation functionality. The OLAP software according to the present invention is capable of analyzing, in real-time, different dimensions of multi-dimensional data in a GL database and identifying patterns or relationships among the data as described in greater detail hereinafter.

Figure 1:
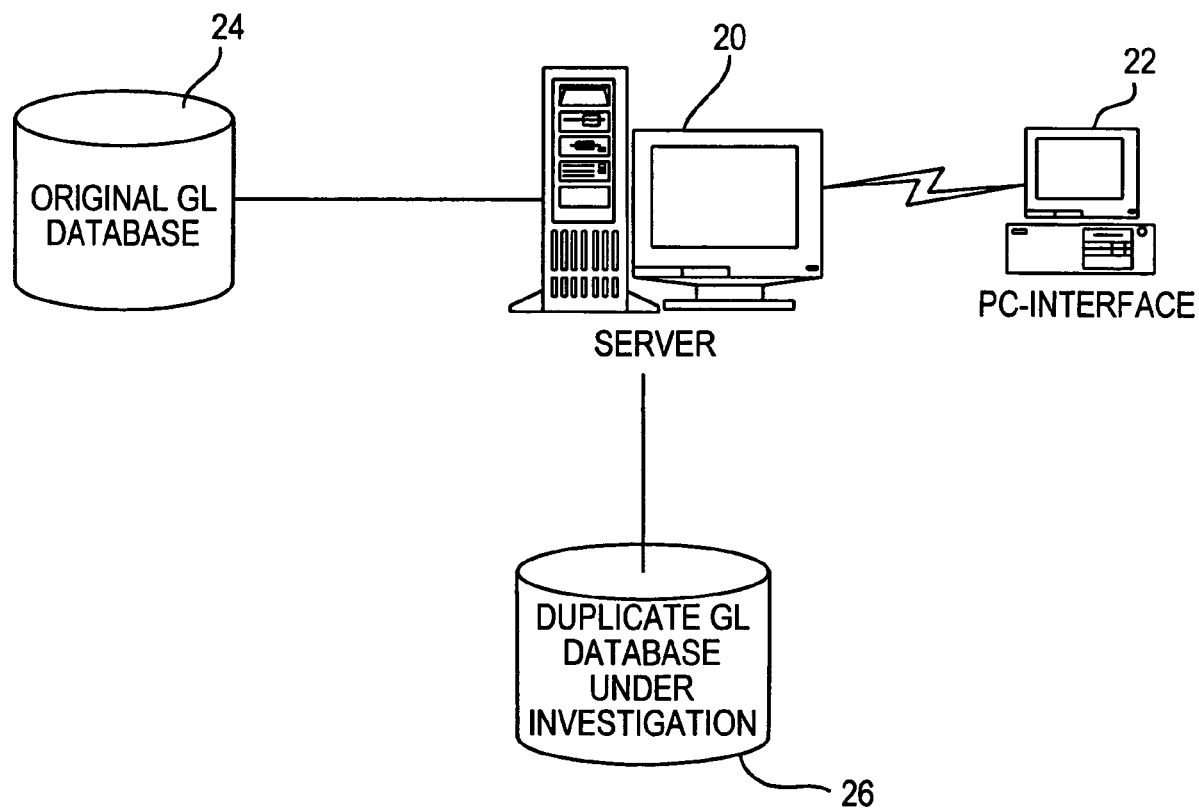
FIG. 1 is a schematic diagram of a system constructed and arranged in accordance with a preferred embodiment of the present invention.

It should be understood that the OLAP software according to the present invention can reside on a conventional server 20 which can track how data are organized in a database and which includes functions for analyzing the data [see FIG. 1]. There are suitable database servers available for nearly all the current major database systems. The server can be electronically coupled to a user interface 22 including conventional input and display devices. The user interface can be a remote interface coupled to the server via a publicly accessible global computer network such as, for example, the Internet.

In conducting a forensic examination of a financial database 24 in accordance with the present invention, the financial data (e.g., GL and chart of accounts listing account numbers used in the GL and their related information) under investigation are first obtained and loaded (in accordance with the appropriate database provider format) on a preferably separate duplicate read-only database 26 accessible to the OLAP software according to the present invention [FIG. 2, step 1; see also FIG. 1 and FIG. 6c]. FIGS. 3a-3c illustrate sample file and field requirements for a GL, a chart of accounts and also a trial balance.

Desirably, the accuracy and completeness of the data load are measured/verified by the new software by automatically totaling amounts in accounts within the financial database [FIG. 2, step 2].

During the data loading process, the data can be flagged and statistical information added thereto as appropriate.

After the data loading process, summary statistics and metrics on the data can be generated to highlight any anomalous items [step 3]. Summary statistics and metrics can include (i) a sum and count of positive amounts, (ii) a sum and count of negative amounts, (iii) a sum and count of all amounts, (iv) minimum and maximum amounts, (v) a count of nulls and (vi) averages and standard deviations.

Financial data are broken out into specific categories and additional fields are added [step 4]. An initial analysis of the data is conducted and the data are broken out into income statement populations including, for example, sales, cost of sales, labor, taxes, depreciation/amortization, interest and other income/expenses, by periods, i.e., by day, month, a quarter or year. The data are also broken out into balance statement populations such as, for example, cash, accounts receivable, accounts payable and contingent liabilities.

Thereafter, the data are preferably reconciled to the associated trial balance to assess the accuracy and completeness of the data [step 5]. From steps 4 and 5, the level of activity of transaction entries within and across each income statement and balance sheet component can be ascertained and any unusual components can be identified.

Accordingly, using, for example, a GL as the database under investigation, the new system, software and method according to the present invention are designed to enable the forensic accountant to efficiently conduct the following activity:

run statistics on numeric/amount and date fields—assess whether the top (e.g., top 5) highest and lowest transaction entries are appropriate (are the highest and lowest dates reflective of the cutoffs of the file?/are the highest and lowest entries in the amount fields reasonable?)—compare to average amounts to understand what a "reasonable" entry would be;

using the findings from the above activity, filter and extract any unusual findings—i.e., high/low transaction entries, entries close to cutoffs that would inflate earnings, unusual credits to revenue accounts, etc.—pull the records with the highest (e.g., 50) and lowest (e.g., 50) balances for further review by a forensic accountant.

obtain a listing of accounts and identify the accounts that would be at higher risk of being used to inflate earnings or perpetrate fraud—i.e., accounts that have certain restriction as to who can make entries to them, "Other" and "Misc." revenue and expense accounts;

review transaction entries that are entered around a period end for unusual activity;

summarize on the month of entry of the transaction entry and on the effective date of the transaction—identify any unusual fluctuations by month especially at the end of periods (do the same for both debits and credits);

consider how the transaction entries in each population and financial component are disbursed—are there several very large entries?

look for duplicate transaction entries (desirably, excluding fields that, by their exclusion, would reduce the likelihood of finding duplicates, such as entry date, sales invoice number, or transaction number);

reconcile the total amount of all transaction entries affecting a given account category (e.g., the sales accounts) to the total amounts recorded in the associated transaction account;

apply Benford's Law (described in greater detail hereinafter) with respect to the amount fields;

review debits/credits between various reserve accounts or between various liability accounts (to identify reserve increases/adjustments that are by-passing the profit/loss accounts);

review debits to reserve accounts—inventory or accounts receivable (or other) credit or profit/loss accounts (releasing reserves to income statement—to identify potential understatement of reserves);

review debits for assets/credits for expenses (to identify miscapitalization of expenses);

review debits for expenses/credits for cost of goods sold (to identify manipulation of margins);

review debits for accounts receivable/credits for revenue (to identify revenue that is prematurely recognized);

review debits for inventory/credits for cost of goods sold (to identify expenses that are inappropriately lowered); and review debits for accounts payable/credits for accounts receivable (to identify if there is engagement in barter, or reciprocal transactions with customers who are also vendors where no money is changing hands).

To achieve the foregoing, pre-defined, yet customizable, templates (defining attributes to be analyzed) are loaded into the new software according to the present invention [step 6] and n-dimensional data analysis is effected using the software to examine the data in real-time [step 7], preferably across all populations (e.g., sales, cost of sales, labor, taxes, depreciation/amortization, interest and other income/expenses). Continuing with the GL database example, the templates, or attributes to be analyzed, can include, without limitation, (i) reclassification and adjusting transaction entries, (ii) transaction type, (iii) duplicates, (iv) amounts that end in 0.00, (v) variance from Benford's Law (leading digit phenomenon—as explained in greater detail hereinafter), (vi) transaction entry description/remarks, (vii) Z-score relationships (as explained in greater detail hereinafter), (viii) transaction entry user (by Z-score) and (ix) items occurring within a preselected time period (e.g., 15 days) before and after the closing of each accounting period (including by transaction entry user).

It should be appreciated that the foregoing attributes are based on the recognition that fraudulent entries can include entries (a) made to unrelated, unusual, or seldom-used accounts, (b) made by individuals who typically do not make transaction entries, (c) recorded at the end of the period or as post-closing entries that have little or no explanation or description, (d) made either before or during the preparation of the financial statements that do not have account numbers, or (e) that contain round numbers or a consistent ending number.

Data summaries labeled "profiles" are then created, read using the new software according to the present invention and automatically exported into standard, yet customizable, reports [step 8], and records that are unusual and significant are highlighted and cross-tabulated by attribute, user and/or source [step 9]. As discussed in greater detail hereinafter, the profiles comprise data cubes and grids which define 3-D topographical and interactive maps to the database created by the software according to the present invention that facilitate efficient navigation through the data stored therein. After reviewing the profiles and navigating to areas of interest, the forensic examiner can "drill down" to explore underlying transaction entries using, for example, drag and drop and point-and-click techniques, to identify significant and anomalous entries for potential selection and testing [see FIG. 2b, steps 9a-9d].

The forensic examiner is interested in, and using the new software and method according to the present invention is equipped to find, unusual activity, patterns and trends within and among categories within the financial data (e.g., increases to labor expense after layoffs; increases in sales toward the end of every quarter and decreases in sales at the beginning of every quarter).

Figure 4A:
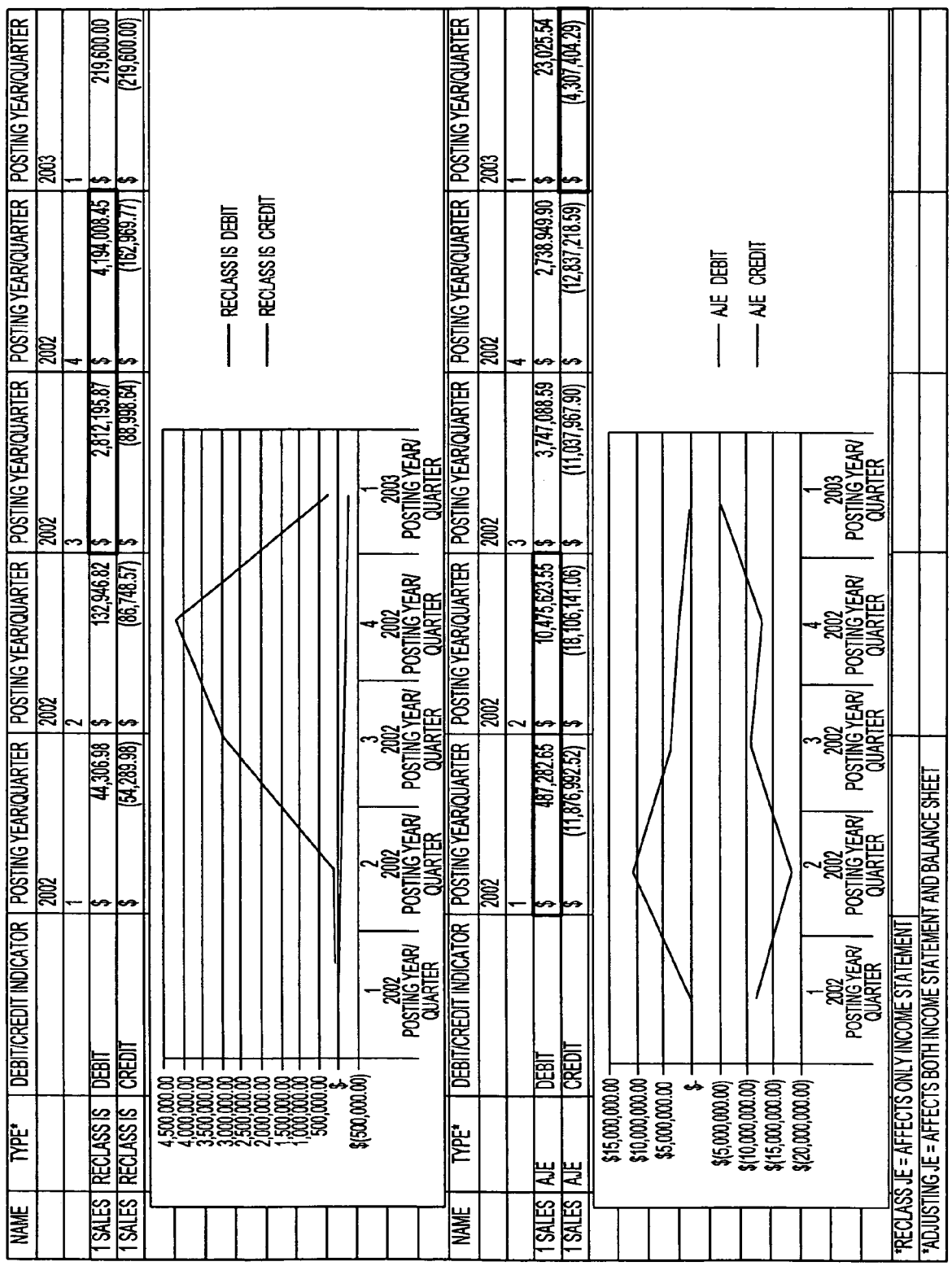

For the reclassification attribute [FIG. 4a], the forensic examiner is interested in identifying amounts that have been reclassified from one account to other accounts and which impact the financial reporting of transactions. To this end, the examiner will look for transactions that transfer either large amounts or recurring small amounts to other accounts without sufficient explanation. This can readily be accomplished using the new software and method according to the present invention by, for example, looking for trends in reclassifications from period to period that are atypical or do not agree with trends in other transaction entry types.

Figure 4B:
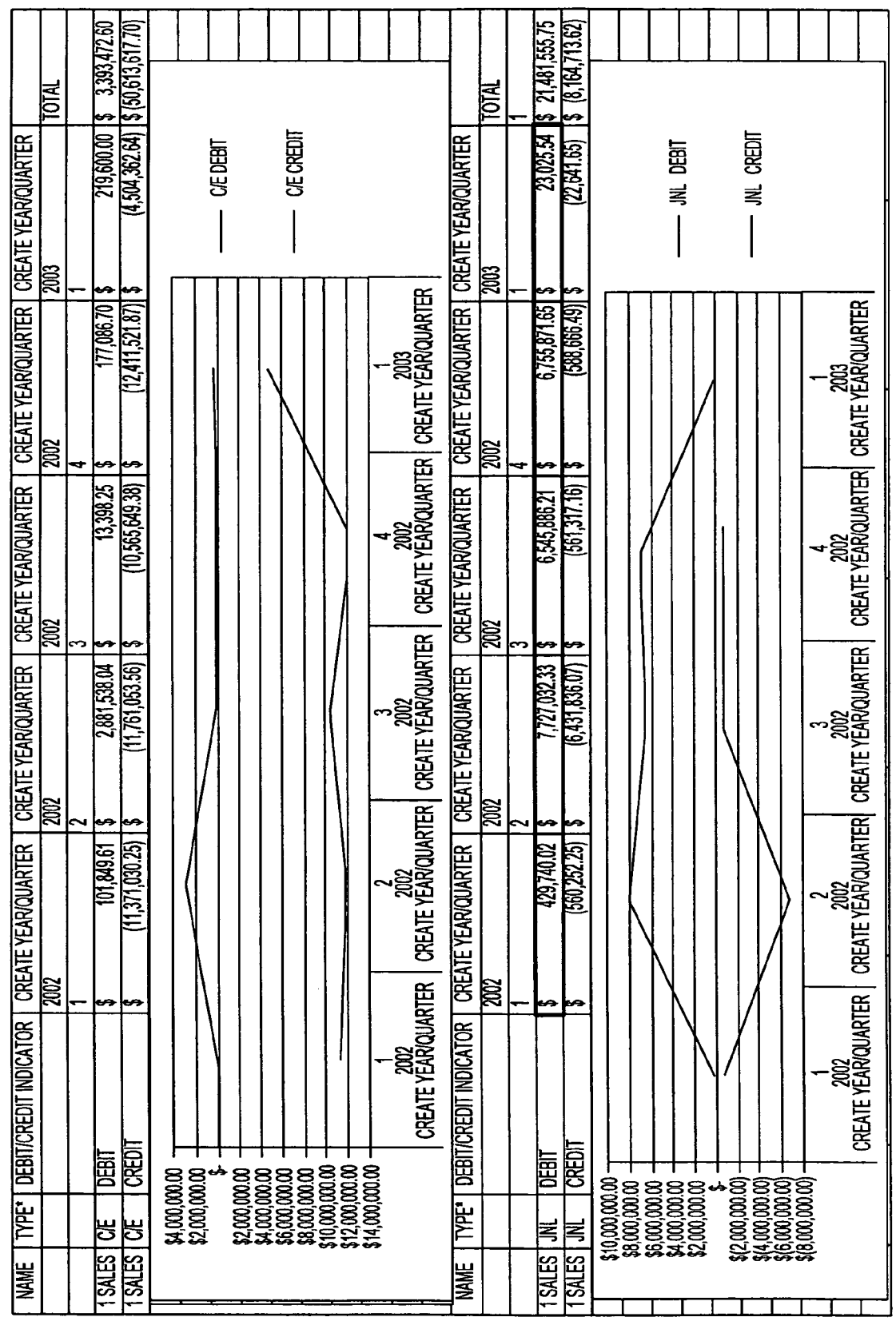

For the attribute of a transaction type, the forensic examiner is interested in identifying regular and closing entries that serve to increase revenues or decrease costs. To this end, the examiner will look for increases in one period that are reversed by decreases in a following period, and transactions made after year end that significantly change the amount of revenue recognized. This can readily be accomplished using the software and method according to the present invention by, for example, reviewing graphical representations generated by the inventive software for unusual characteristics [FIG. 4b] and by reviewing the net impact of increases and decreases by period.

Figure 4C:
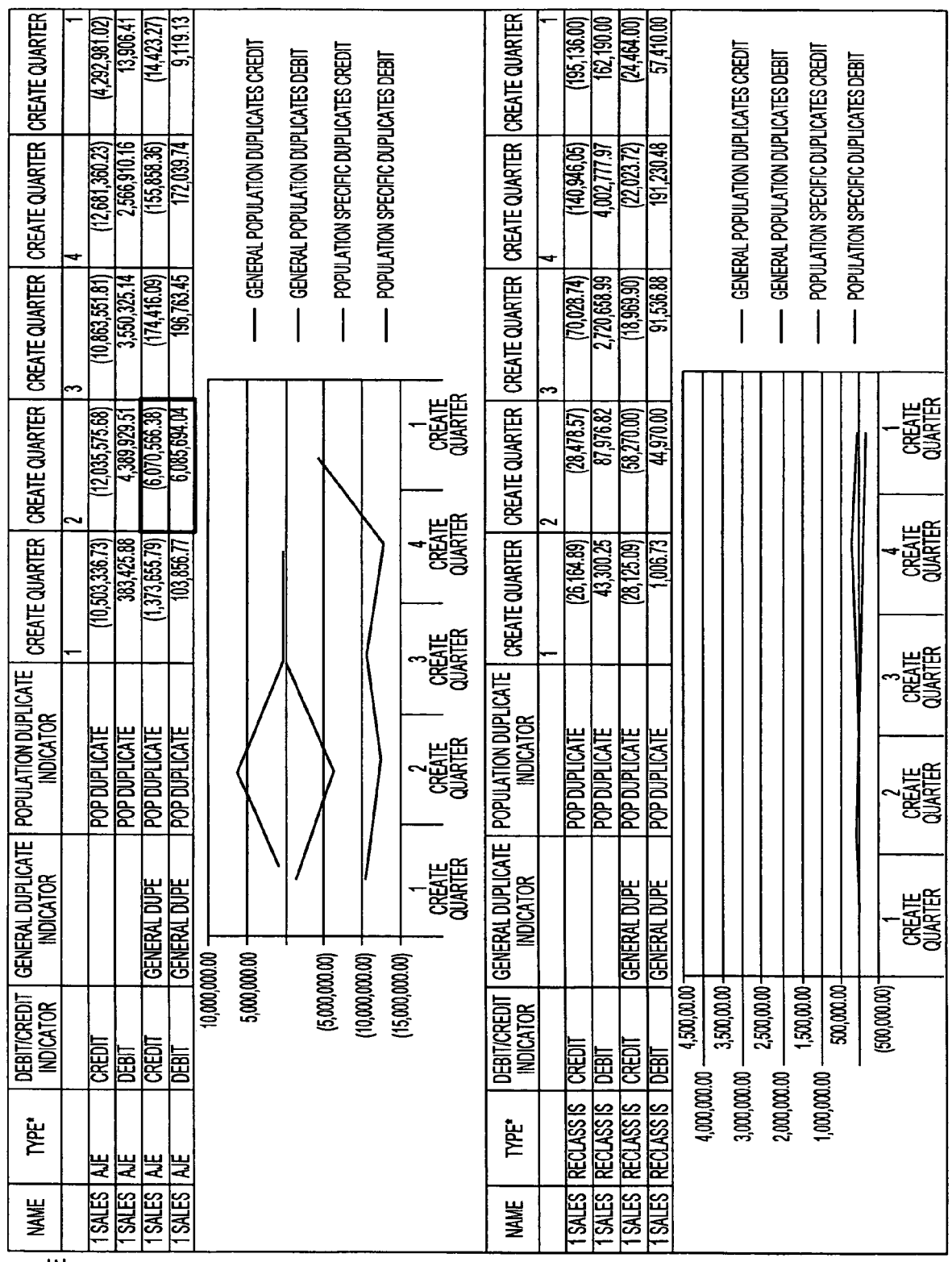

For the attribute of duplicate entries, the forensic examiner is interested in transactions with amounts that repeat during a period without sufficient explanation. To this end, the examiner will look for volatility in the number of transactions that represent duplicate amounts. This can readily be accomplished using the software and method according to the present invention by, for example, reviewing graphical representations generated by the inventive software that depict the number of transactions by a particular amount [FIG. 4c].

For the ending digits attribute, the forensic examiner is interested in transactions with amounts that end in 0.00. To this end, the examiner will look for volatility in the increases, decreases and the net impact of transactions with amounts ending in 0.00. This can readily be accomplished using the new software and method according to the present invention by, for example, reviewing graphical representations generated by the inventive software that depict the number of transactions of a particular amount ending in 0.00 [FIG. 4d].

Benford's Law is a phenomenological law also known as the leading digit phenomenon. Benford's Law states that in listings, tables of statistics, etc., the digit "1" tends to occur with a probability of about 30%, much greater than the expected 11.1% (i.e., one digit out of nine).

Figure 4E:
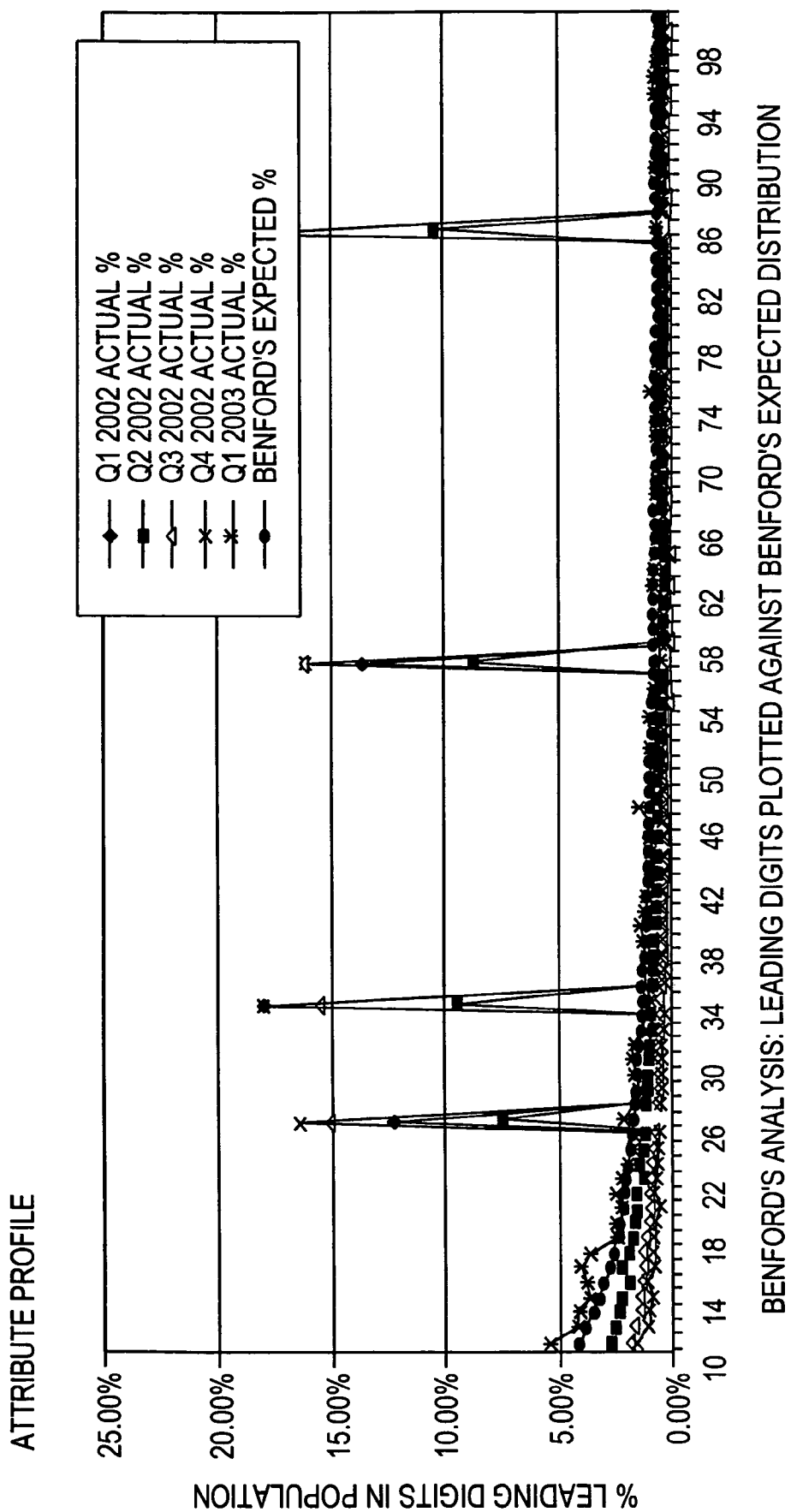

For the attribute associated with variance from Benford's Law, the forensic examiner is interested in transaction entries that are at odds with the Law based on the first digits of each transaction entry amount. The forensic examiner will look for, and using the new software and method according to the present invention is equipped to find, unusual peaks or valleys around the Benford's expectation line in graphical representations generated by the inventive software [FIG. 4e].

For the transaction entry explanation attribute, the forensic examiner is interested in transactions with unclear and/or suspect descriptions. To this end, the examiner will look for, and using the software and method according to the present invention is equipped to find, transaction descriptions that make large adjustments at the direction of a particular person, entries without explanations, and explanations that do not comport with the business of the subject organization by grouping transactions by description.

Depending on the probability distribution associated with the data in the database under investigation, the software according to the present invention can be customized to calculate statistics related to the distribution; for example the software can be adapted to calculate the Z-score. Generally speaking, the Z-score for an item indicates how far and in what direction that item deviates from its distribution's mean, expressed in units of its distribution's standard deviation. In general, the mathematics of the Z-score are such that if every item in the distribution is converted to its Z-score, the transformed scores will necessarily have a mean of zero and a standard deviation of one.

For the Z-score attribute, the forensic examiner is interested in identifying transaction entries with amounts that deviate by more than one or two standard deviations (+/−1 or 2) from the average amount within that financial statement component. This can readily be accomplished using the software and method according to the present invention by, using a customizable report to display all transactions of a particular type that are more than +/−1 or 2 standard deviations from the arithmetic average, reviewing graphical representations generated by the inventive software for increases and decreases that fit the foregoing criteria [FIG. 4f].

For the user attribute and for the attribute of items occurring within a preselected time period before and after the closing of each accounting period, the forensic examiner is interested in, and using the new software and method according to the present invention is equipped to find, users who post only certain types of transaction entries, users who post transaction entries identified as unusual in other profiles, and users who post transactions proximate to the close of an accounting period [FIGS. 4g and h]. This is accomplished by using the new software to group and drill down in real-time, within each population type, within and across transaction entry types, especially for transactions that adjust a specific financial component by a large amount.

The forensic examiner may also be interested in identifying transaction entries posted by users involving amounts that deviate by more than one or two standard deviations (+/−1 or 2) from the average amount within that financial component (i.e., a Z-score aspect to the user attribute). This can readily be accomplished using the new software and method according to the present invention by selecting, grouping and drilling down to users who have established amounts that are more than +/−1 or 2 standard deviation from the arithmetic mean [FIG. 4i].

As indicated above, the profiles comprise data cubes and grids which define 3-D topographical and interactive maps to the financial (e.g., GL) database that facilitate efficient navigation through the data stored therein.

Figure 5:
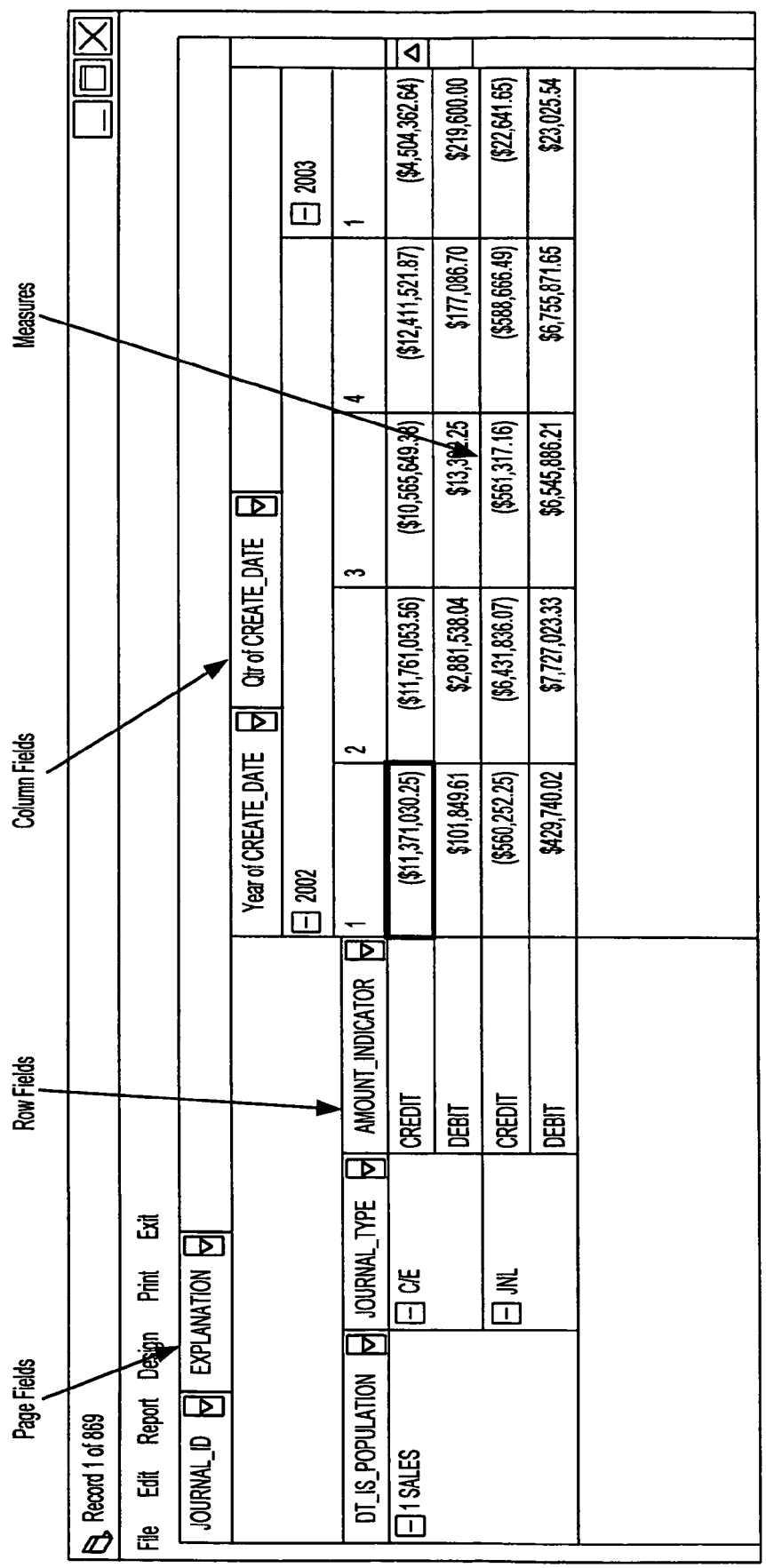
FIG. 5 is an exemplary computer screen output depicting an n-dimensional view of financial data generated using the new software which provides OLAP data interrogation functionality in accordance with a preferred embodiment of the present invention.

A cube is an n-dimensional view of a database, i.e., fields from the cube can be grouped in various dimensions so that relationships between the fields can be viewed. Referring to FIG. 5, the dimensions can include pages (fields that can be "dropped" into the cube, but are in reserve and not currently displayed in the cube), rows (fields on the side of the cube—e.g., "Journal Type" and "Debit/Credit"), columns (fields on the top of the cube—"Create" year and quarter) and measures (fields displayed on the face of the cube), and can be pivoted (moved to and from the column, row, measure and page areas of a cube) for analysis and filtered (in a cube or grid, using criteria to exclude data from the entire population, e.g., to show all increases and hide all decreases). The created views (cube templates) can be saved for later use. OLAP is leveraged to transform the financial data into cubes that can be modified using, for example, point-and-click and drag-and-drop techniques.

A grid is a two-dimensional view of records in a database. In the grid, data can be grouped by a particular field or fields, sorted and filtered, and the created views (grid templates) can be saved for later use. Grid fields can be placed in the row and/or column of a cube while a quantitative grid field can be used as a measure to group the cube into accumulated cells.

The cubes present a summary of the database that a forensic examiner can read to identify data relationships, trends and patterns. The cubes can be navigated (e.g., using drag-and-drop and point-and-click capability) allowing the forensic examiner to select an item in a cube and navigate in the grids in the direction of decreasing dimensions of data and then into significant and unusual entries in the underlying data and/or significant and unusual data user activity for potential selection and further testing [see FIG. 2b, steps 9a-9d]. That is, this feature, which is coded in the software according to the present invention, allows the forensic examiner to drill down obtain additional information on the selected cube item in a resulting grid. The process can be iterative.

It should be appreciated that, based on user activity (i.e., dragging and dropping, pointing and clicking—drilling down), using OLAP, the new software will automatically rearrange data fields as appropriate.

The result is an n-dimensional view of financial transaction entries based on the relationship of such entries to the heightened risk of material misstatement, an n-dimensional view of each attribute, or column of entry data, including tests to identify significant and unusual attributes, an n-dimensional view of transaction creators, and posting sources, including tests to identify significant and unusual users of the financial system.

It should be appreciated that the efficient navigation of a very large financial database (e.g., a large GL) is not the only challenge. With multi-national organizations come multiple financial databases that must be consolidated into one set of financial statements. In consolidation, much of the detailed financial entries are summarized and at a summary level—the assessment of reliable data is most difficult. This means that the forensic examiner may want to look into the financial database of each significant subsidiary.

For companies with multiple disparate financial databases, the software and method according to the present invention can be applied separately to each database. Alternatively, the disparate databases can be migrated to one integrated database that globally records financial entries with an appropriate degree of granularity, and the inventive software and method applied to the integrated database.

Again, although discussed herein in the context of analyzing GLs, it should be understood that the present invention is not limited to analysis of GLs, but has application with respect to other types of databases, financial or otherwise.

Referring again to FIG. 2, based on the cross tabulation of the profile results [step 9], the high-risk areas that may require fieldwork support testing can be identified [step 10]. In the event that high-risk areas are identified, action can be taken to assist in resolving such issues (through modified sample selections, fieldwork procedures, and forensic interviews).

A report of findings and actionable recommendations (in predefined yet customizable format, including statistical and/or graphical presentation) can then be generated [step 11].

It should be appreciated that the generated results of the analysis according to the present invention are specific; the results do not include voluminous data for the forensic examiner to wade through. It should be further appreciated that the results are easily translated into recommendations for next steps.

Figure 6A:
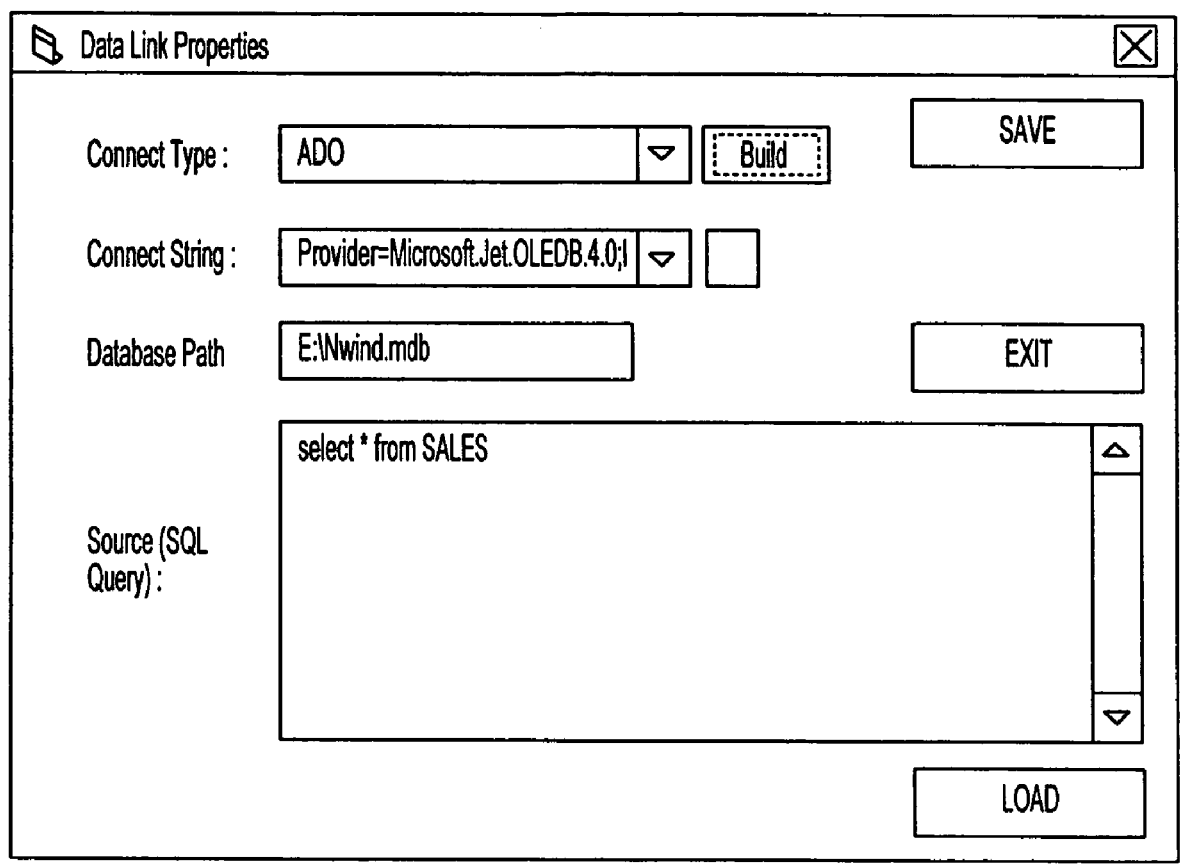
FIGS. 6a-6s depict exemplary user interface displays illustrating aspects of the process for conducting a forensic examination of a financial database using the new software which provides OLAP data interrogation functionality in accordance with a preferred embodiment of the present invention.
Figure 6B:
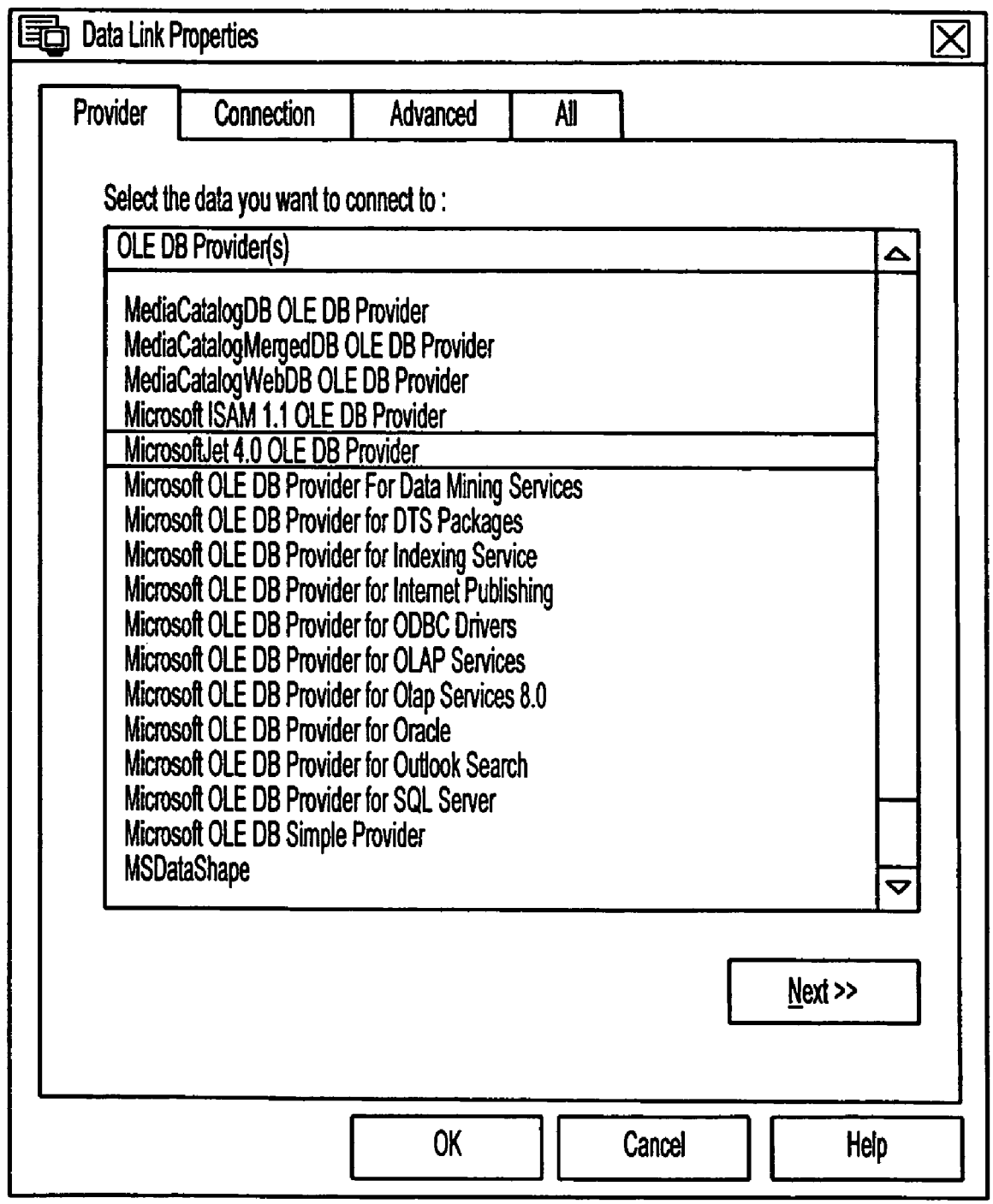

Referring now to FIGS. 6a-6s, in operation, with the new OLAP-based software according to the present invention installed and running, display screens can be presented to the user to enable the user to connect a cube to a database containing the financial data to be reviewed (e.g., a Microsoft Data Connection dialog box [FIG. 6a]) and to load the financial data into the cube (e.g., from a Microsoft Access database file [FIG. 6b]).

Once the data are loaded, the new OLAP-based software according to the present invention will open to the grid screen (two dimensional view of a data table) [FIG. 6c]. This view shows all of the selected fields for the entire table that was loaded.

Figure 6D:
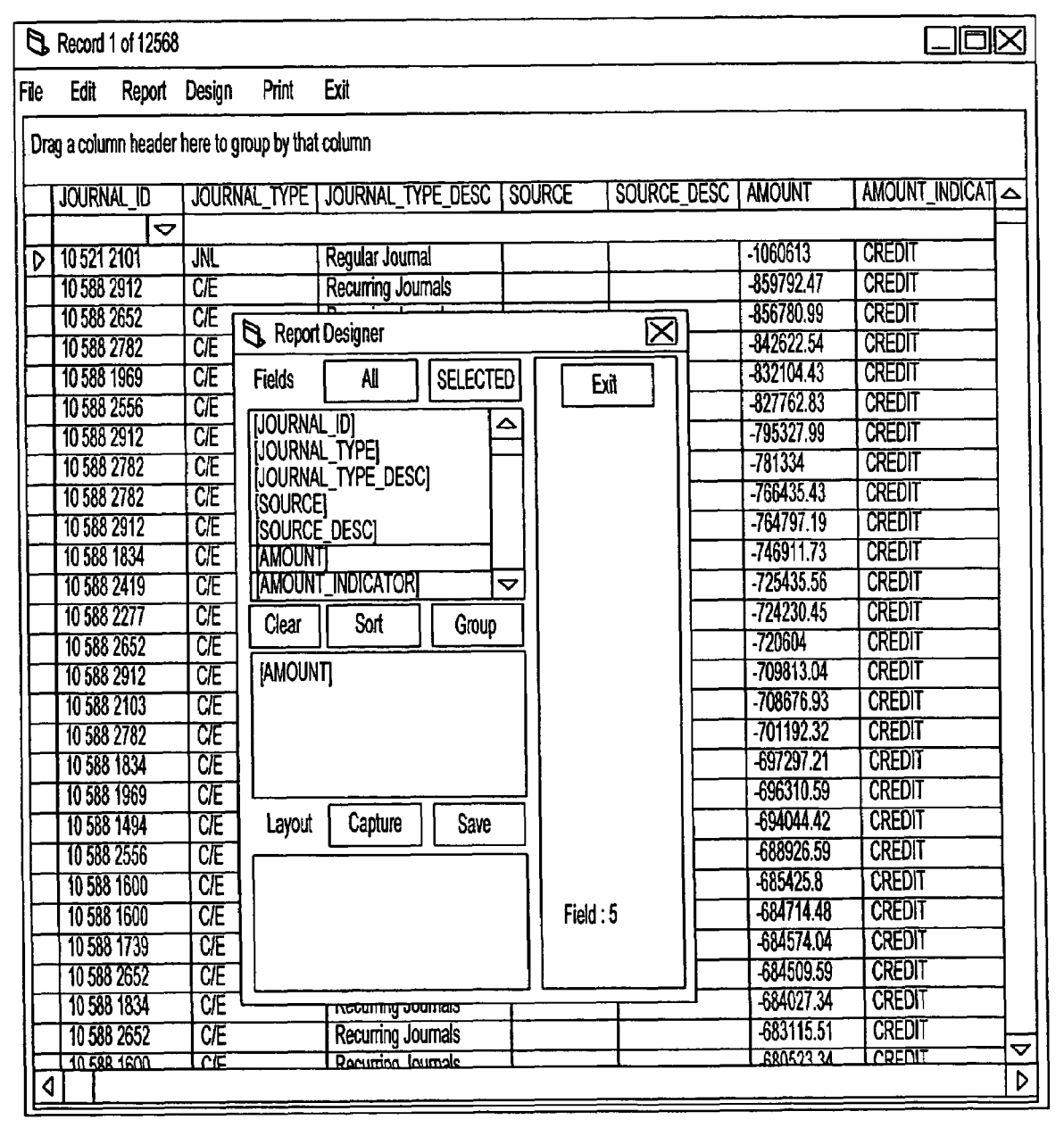

Records can be grouped (e.g., by dragging a column header to the area above the column header names) and sorted [FIG. 6d]. Multiple fields can be grouped at once; multiple columns can be sorted at once—all in real-time.

Filters can be applied [FIG. 6e]. Different filters are displayed depending on the data type of the column. For example, referring to FIG. 6e, with character based data, the "Filter Criteria" box can display for selection by the user fields that: (i) begin with a particular letter, (ii) contain particular text and (iii) are the text.

Figure 6F:
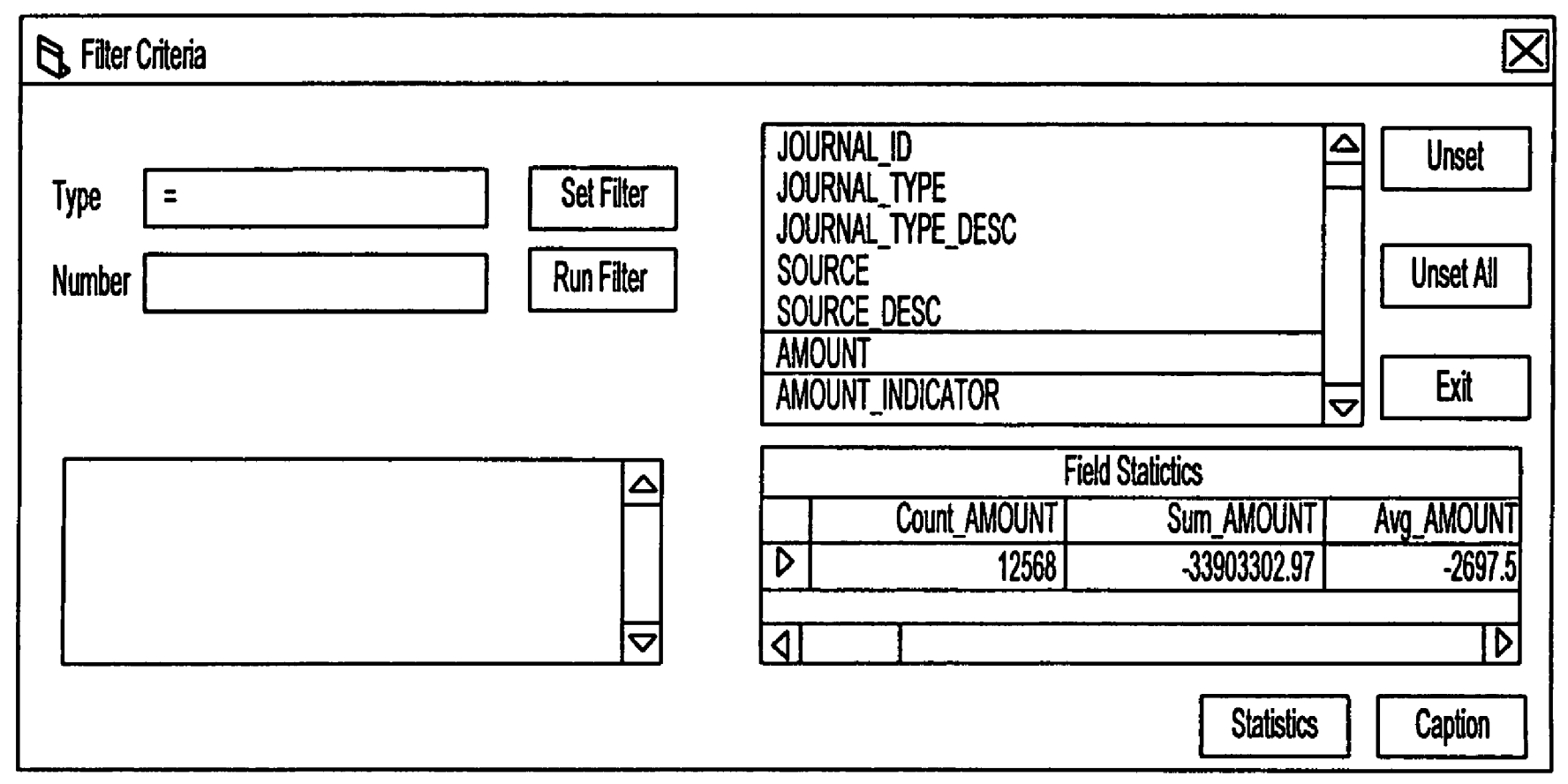

Additionally, in the filter screen, the user can initiate calculations of useful statistics for a particular field selected (e.g., by selecting the button labeled "statistics" [FIG. 6e]). The statistics can include the (i) count of records, (ii) sum of the field, (iii) average amount in the field, (iv) minimum and maximum amounts in the field, (v) standard deviation and (vi) variance between the highest and lowest amounts in the field [FIG. 6f].

Figure 6G:
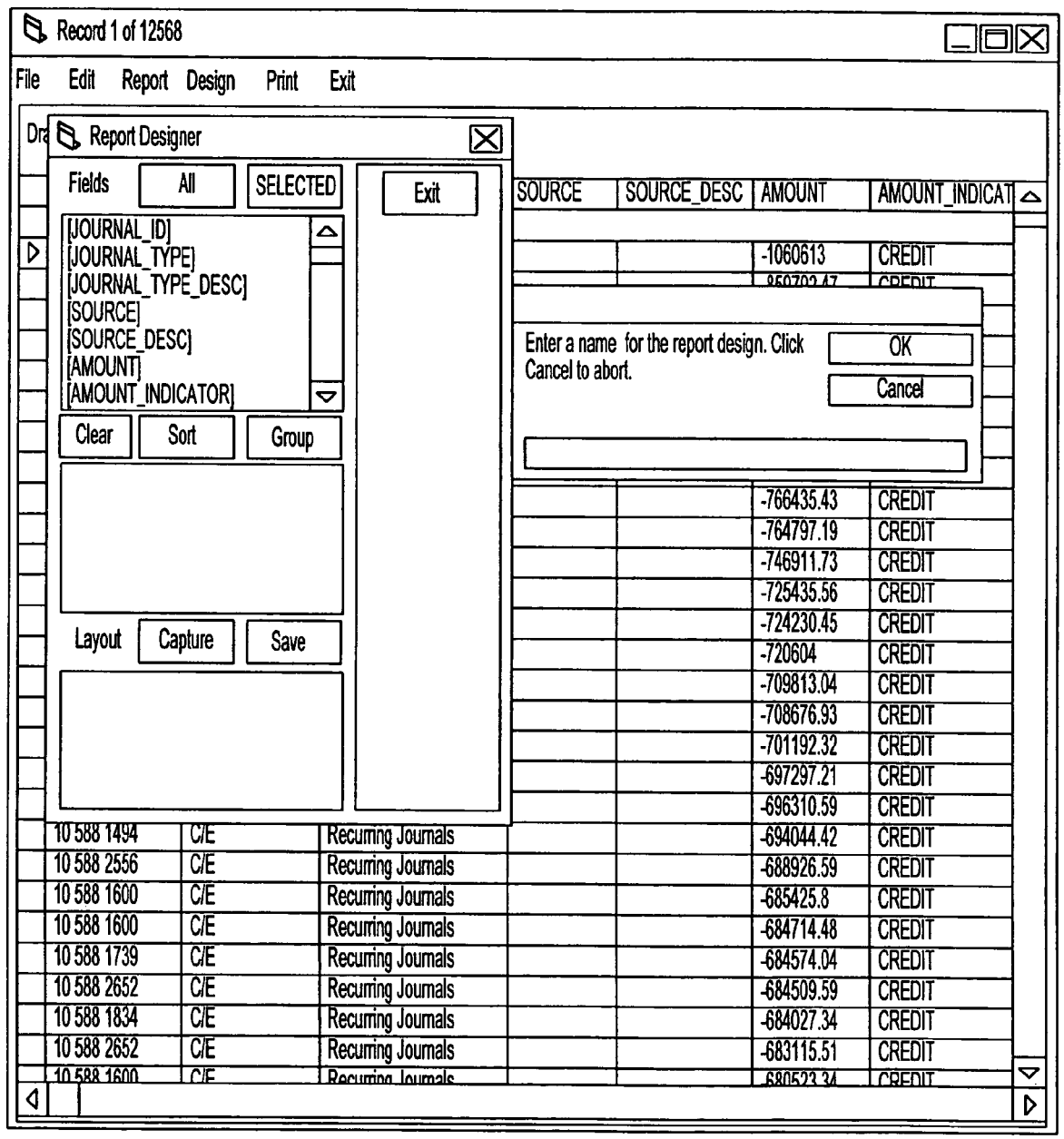

When a suitable layout of a grid is found, the template can be saved to be loaded at a later time [FIG. 6g].

Figure 6H:
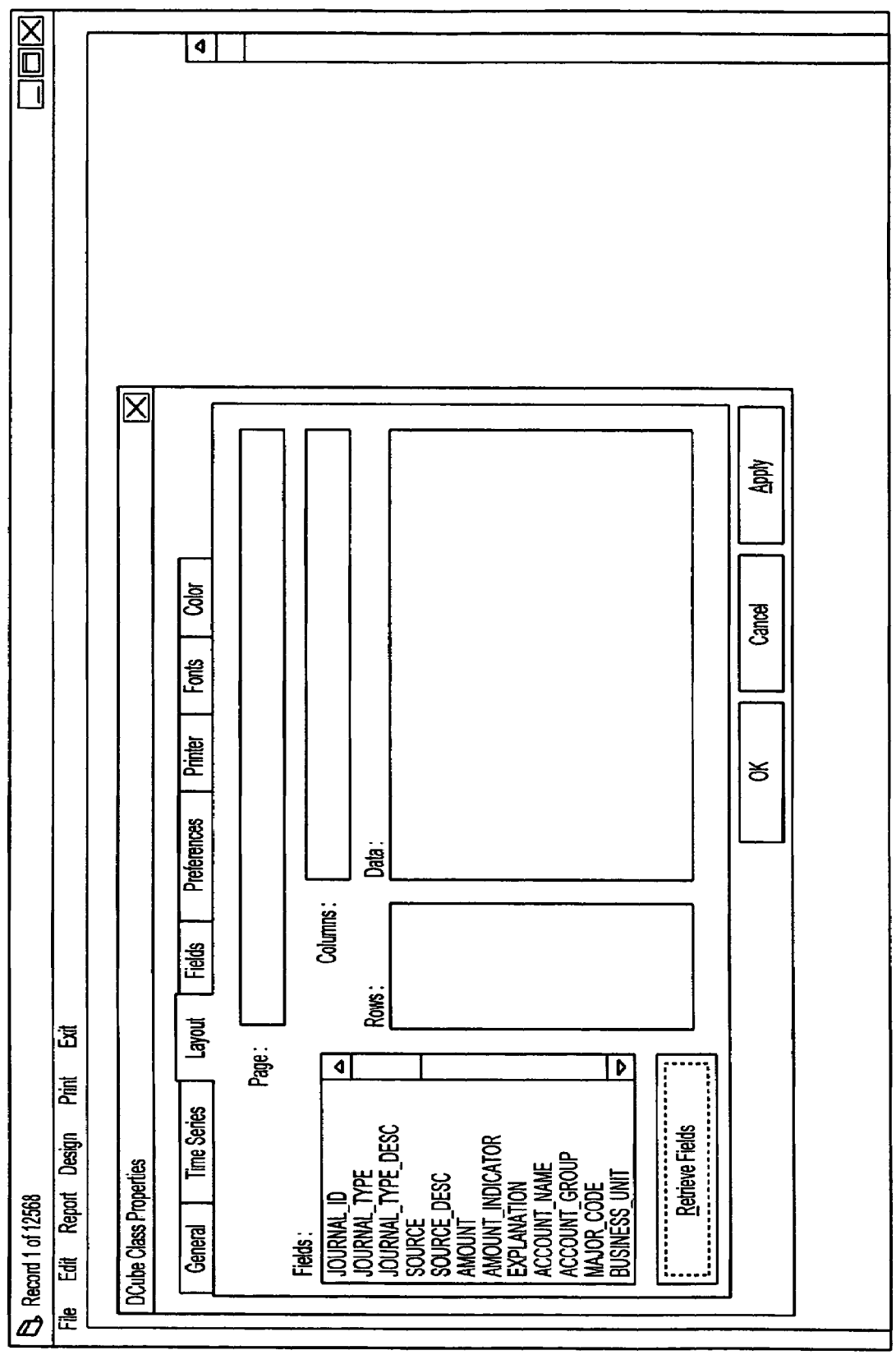

Cubes can also be created easily using drop-down menus presented by the new OLAP-based software of the present invention (e.g., going into the cube view by selecting "File" and "View Cube" and adding fields [FIG. 6h]). For example, FIG. 6i shows a cube created to view "Sales" "Journal Type" entries by "Debit/Credit" and then relate them to the "Create" year and quarter.

Figure 6J:
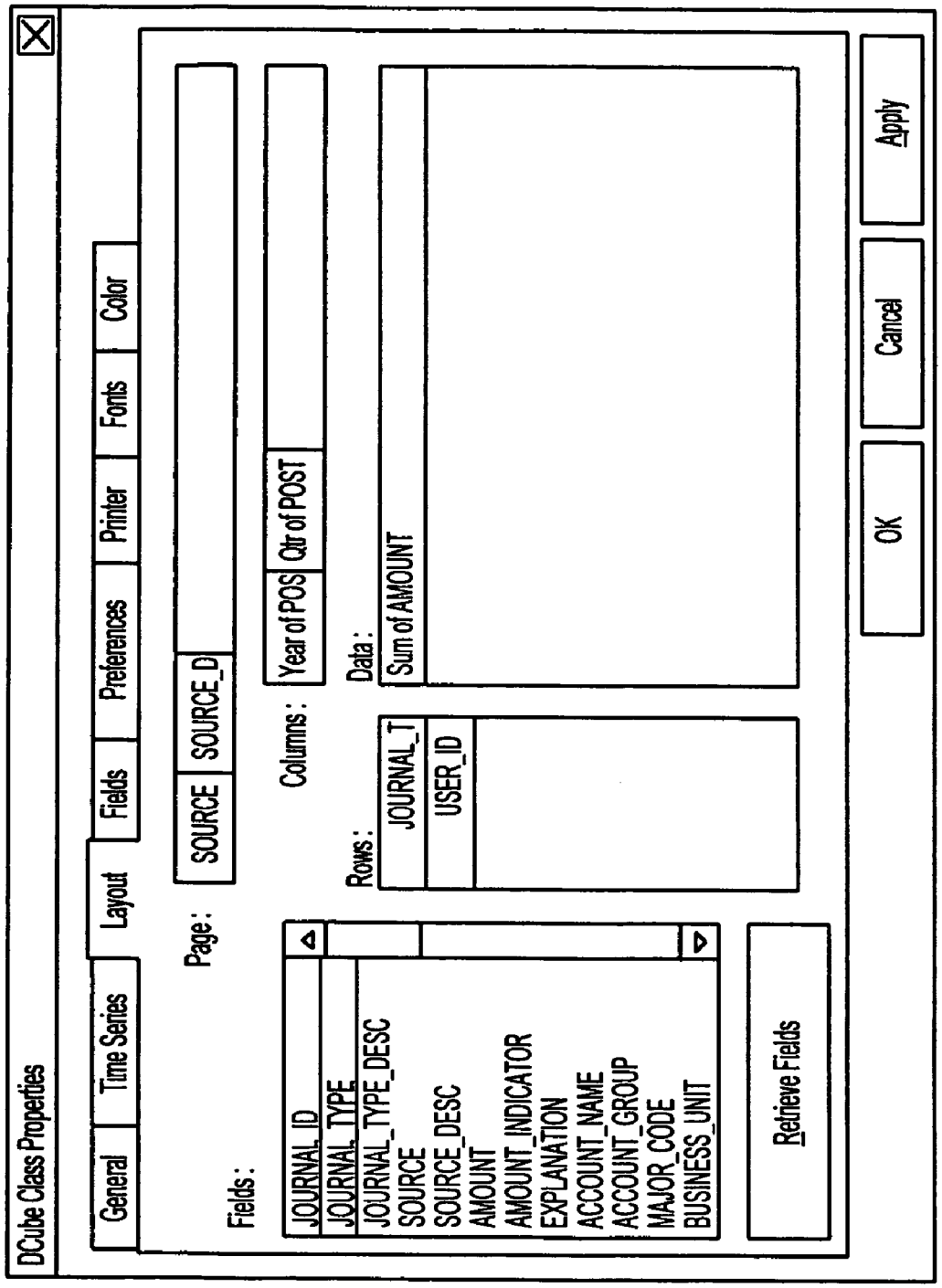

Referring to FIG. 6h, fields can be retrieved from the selected database (e.g., by selecting "Retrieve Fields") and, from the list of produced fields, desired fields can be dragged and dropped in the columns, rows, and measures of the cube [FIG. 6j].

Figure 6K:
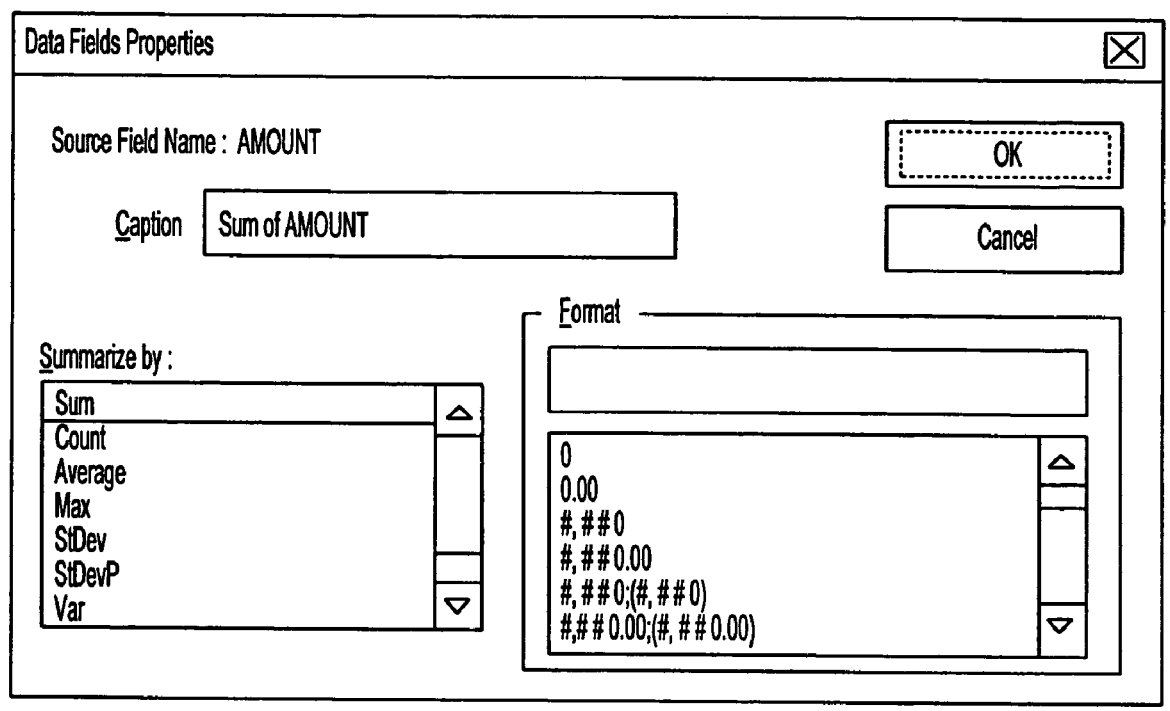

The displayed information in the measure can be changed (e.g., by selecting "Fields" in the measure display box [FIG. 6j] and then selecting "Properties"). FIG. 6k depicts a default setting to "Sum" the field; "Count," "Average," "Max" and "Min" are some other options shown.

When the cube is in the desired layout it can be saved for later use (e.g., by selecting "Report Design" then "Load/Save" and then "Save" and naming the cube file [FIG. 6l]).

Figure 6M:
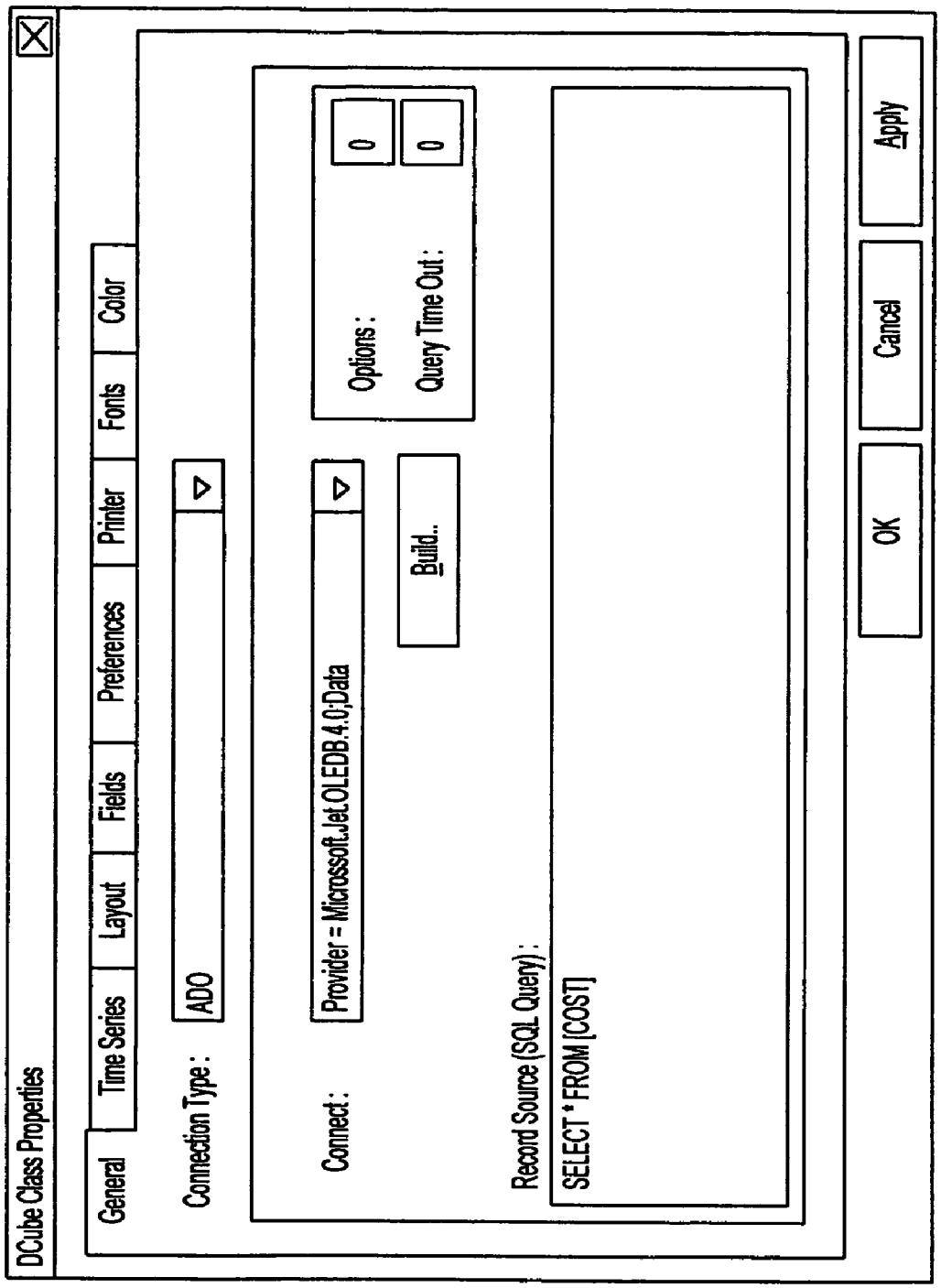

Once a template has been run on one of the populations (e.g., income statement populations such as, for example, sales, cost of sales, labor, depreciation/amortization, other income/expense), another population may be brought up. This involves pointing the cube file to the appropriate table in the database. Referring to FIGS. 6l-6n, changing cubes from one population to another can be accomplished by viewing another set of data (e.g., by selecting the "Report Design" drop-down menu and selecting "Designer" to get to the "DCube Class Properties" window), and identifying the table to be accessed (e.g., by changing, on the "General" tab, the "Record Source" coding—for example, changing "SELECT * FROM SALES" to "SELECT * FROM COST" to view cost of sales data in the cube, and then selecting "OK" and, on the menu, selecting "Edit-Refresh" to update the data in the cube).

Data analysis according to the present invention can involve "pivoting"—that is, moving fields in the cube from one location on the cube to another (e.g., by dragging and dropping). This automatically changes the measures displayed in the cube in real-time.

Any field that is placed as a page, column or row can be pivoted. For example, a field that has been placed in a cube as a row can be pivoted to a column or a page field, in real-time.

Referring to FIG. 6o, filtering can be accomplished by selecting or deselecting items (shown in a drop-down menu) in a particular field. If the box next to the item is marked (e.g., with an "X") the related information will be included in the view; if not marked (e.g., if the "X" is de-selected), the related information will not be included in the view and all measures/groupings will modify accordingly, in real-time.

Figure 6P:
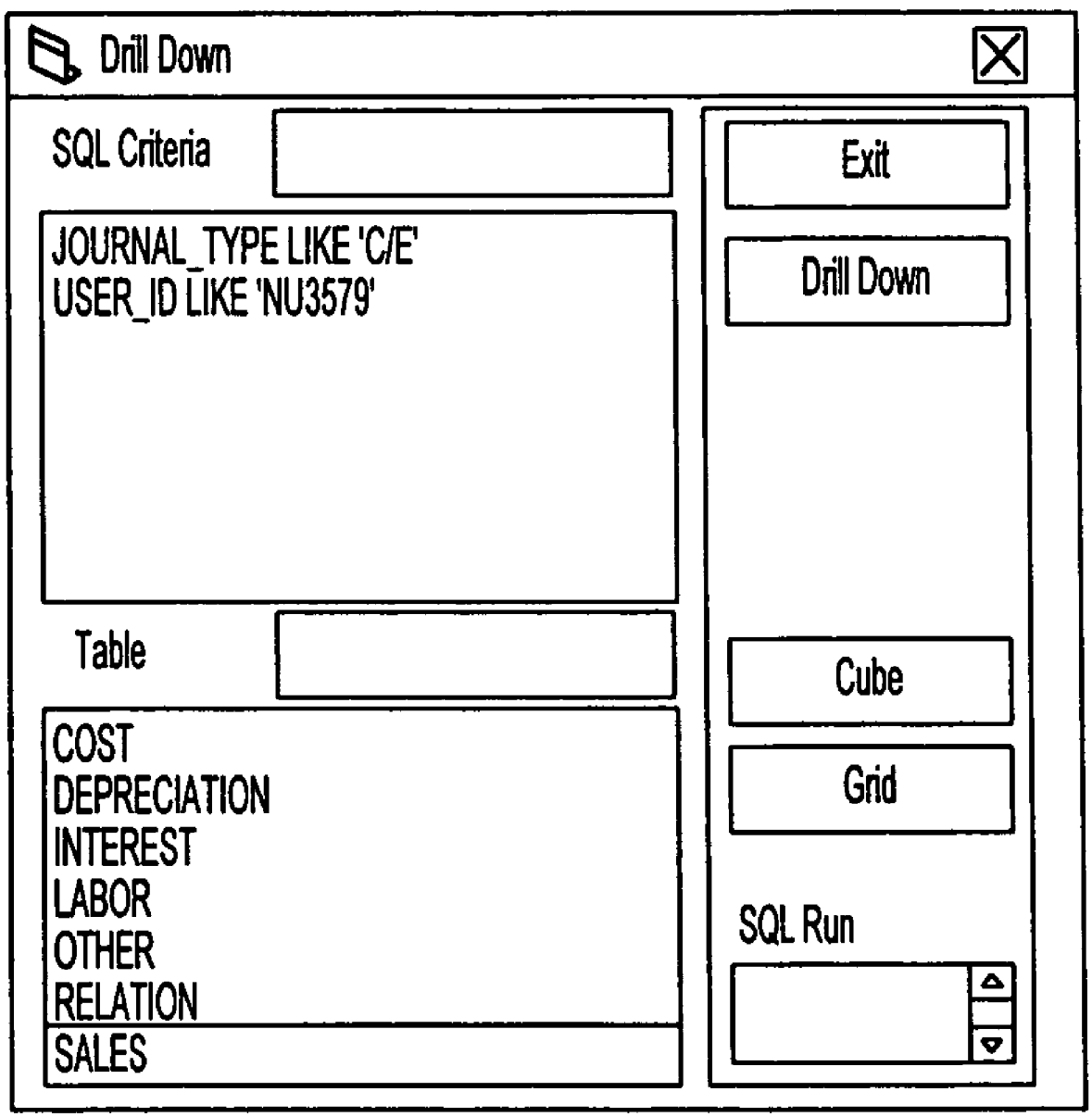

If more understanding of a measure in a cube is sought, the forensic examiner can drill down to the supporting records and view them in the grid. Referring to FIG. 6p, this can be accomplished by selecting the cell that is of interest and selecting the criteria for the drill-down (e.g., from a "Drill Down" menu), and then selecting the table against which the criteria will be run. That is, the system, software and method according to the present invention automates and simplifies the drill-down from a cell in the cube to corresponding records in the grid by: (i) enabling a user to select a cell in the cube; (ii) displaying a drill down dialogue box; (iii) presenting drill down choices (see FIG. 6P); and, (iv) navigating to select grid records based on user choices. This feature gives forensic accountants a flexible and powerful "point and click" investigation tool.

Figure 6Q:
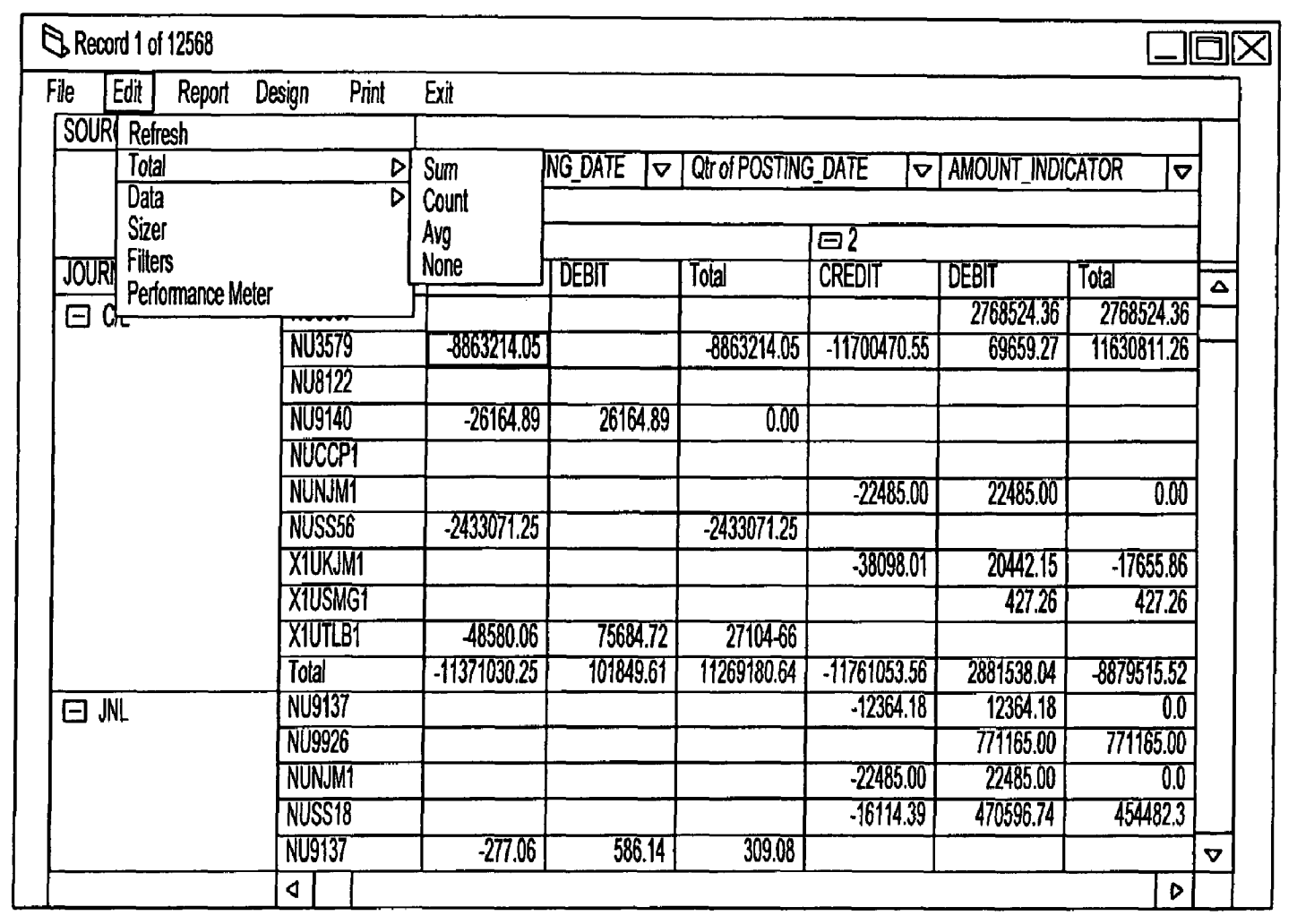

Once in the cube, the forensic examiner can view aggregated information for the groupings that have been created in the cube. This may be sum of amounts ("Sum"), record counts ("Count"), or average amounts ("Avg") [FIG. 6q, "Edit" and "Total" menus].

Percentage options are provided by clicking on a "%" button on the screen. The options allow for the percentage of the total of each column or the total of each row for each respective cell to be displayed [FIG. 6r, "Edit" and "Data" menus].

Output can be produced to a printer or a spreadsheet program such as, for example, Microsoft Excel [FIG. 6s].

Accordingly, the present invention embodies a new system, software and method that uniquely integrates accounting principles, statistics, technology and investigative techniques to provide forensic accountants with the capability to explore large quantities of data in a database in real-time using online analytical processing to pinpoint records that are both unusual and significant, e.g., as an indicator of fraudulent activity.

It will thus be seen that the objects set forth above, among those made apparent from the preceding description, are efficiently attained and, since certain changes may be made in carrying out the above method and in the constructions set forth for the system without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A computerized method for conducting a forensic examination of multi-dimensional data stored in a database, comprising the steps of:
providing multidimensional data in a database accessible to software having real-time data interrogation functionality, the software adapted to analyze different dimensions of the data and to identify at least one of patterns and relationships among the data,
categorizing the data into at least one preselected category,
loading at least one template defining at least one data analysis attribute preselected to indicate at least one of significant and anomalous data into the software,
effecting multi-dimensional data analysis on the data in real-time based on the at least one preselected template attribute,
creating at least one profiles defining at least one map to the database to facilitate navigation through the analyzed data,
navigating through the analyzed data in the direction of decreasing dimensions of the data based on the at least one profile, and identifying at least one aspect of the data that is at least one of significant and anomalous; and
generating at least one of summary statistics and summary metrics on the data stored in the database, wherein at least one of said providing, categorizing, loading effecting, creating and navigating steps is effected using a data processor.

2. The method according to claim 1, further comprising the steps of cross-tabulating the at least one significant and anomalous aspect of the data and identifying associated fieldwork activity requirements.

3. The method according to claim 1, further comprising the step of automatically generating a report of the at least one significant and anomalous aspect of the data.

4. The method according to claim 1, further comprising the step of automatically generating a report of actionable recommendations based on the at least one significant and anomalous aspect of the data.

5. The method according to claim 1, further comprising the step of verifying at least one of accuracy and completeness of the data loaded in the database.

6. The method according to claim 1, wherein the at least one of summary statistics and summary metrics includes at lest one of (i) positive data values, (ii) negative data values, (iii) all data values, (iv) minimum data values, (v) maximum data values, (vi) nulls, (vii) averages of data values, and (viii) standard deviations of data values.

7. The method according to claim 1, wherein the data are financial data.

8. The method according to claim 7, wherein the financial data are general ledger data.

9. The method according to claim 8, wherein the step of categorizing the data into at least one preselected category includes breaking the data into at least one of income statement populations and balance sheet populations.

10. The method according to claim 9, further comprising the step of reconciling the data to an associated trial balance.

11. The method according to claim 9, wherein the step of effecting multi-dimensional data analysis on the data in real-time based on the at least one preselected template attribute is used to examine the data across the at least one of income statement populations and balance sheet populations.

12. The method according to claim 9, wherein the step of effecting multi-dimensional data analysis on the data in real-time based on the at least one preselected template attribute includes identifying at least one of patterns and relationships between the populations of the at least one of income statement populations and balance sheet populations.

13. The method according to claim 8, wherein the at least one template includes at least one of (i) reclassification and adjusting transaction entries, (ii) transaction type, (iii) duplicates, (iv) amounts that end in 0.00, (v) variance from Benford's Law, (vi) transaction entry description, (vii) Z-score relationships, (viii) transaction entry user, and (ix) items occurring within a preselected time period before and after the closing of an accounting period.

14. The method according to claim 1, wherein the step of effecting multi-dimensional data analysis on the data in real-time based on the at least one preselected template attribute includes identifying at least one of patterns and relationships among the data.

15. The method according to claim 1, wherein the software is online analytical processing software.

16. The method according to claim 1, further comprising the step of automatically exporting the at least one profile to at least one report.

17. The method according to claim 1, wherein the at least one profile includes at least one data cube and at least one grid, the at least one data cube representing an n-dimensional view of the database, the at least one grid representing a two-dimensional view of records in the database.

18. The method according to claim 17, wherein the n-dimensional view of the database includes pages, rows, columns and measures.

19. The method according to claim 17, wherein the n-dimensional view of the database is adapted to be pivoted for analysis and filtered.

20. The method according to claim 17, wherein data in the at least one grid is at least one of grouped, sorted and filtered.

21. The method according to claim 17, wherein the step of navigating through the analyzed data in the direction of decreasing dimensions of the data based on the at least one profile includes selecting an analysis criterion in the at least one data cube and drilling down in an associated one of the at least one grid.

22. The method according to claim 1, wherein the at least one profile defines at least one three dimensional map.

* * * * *